United States Patent
Greel et al.

(10) Patent No.: US 11,729,659 B2
(45) Date of Patent: Aug. 15, 2023

(54) MULTIPLE-INPUT, MULTIPLE-OUTPUT (MIMO) MULTIHOP MOBILE AD-HOC NETWORK (MANET) ROUTING

(71) Applicant: The Government of the United States, as represented by the Secretary of the Army, Washington, DC (US)

(72) Inventors: Richard Greel, Bel Air, MD (US); Radhika Roy, Howell, NJ (US); Rocio Bauer, Peach Bottom, PA (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 148 days.

(21) Appl. No.: 17/327,814

(22) Filed: May 24, 2021

(65) Prior Publication Data
US 2021/0352519 A1  Nov. 11, 2021

Related U.S. Application Data

(62) Division of application No. 16/149,180, filed on Oct. 2, 2018, now Pat. No. 11,019,525.

(51) Int. Cl.
*H04W 28/02* (2009.01)
*H04B 7/024* (2017.01)
(Continued)

(52) U.S. Cl.
CPC ........ *H04W 28/0263* (2013.01); *H04B 7/024* (2013.01); *H04B 17/336* (2015.01);
(Continued)

(58) Field of Classification Search
CPC ............ H04W 28/0263; H04W 40/28; H04W 28/085; H04W 28/0236; H04W 12/04;
(Continued)

(56) References Cited

U.S. PATENT DOCUMENTS

2005/0195784 A1* 9/2005 Freedman ............... H04L 1/06
370/349
2007/0053295 A1* 3/2007 Cleveland ............. H04L 47/122
370/406

(Continued)

FOREIGN PATENT DOCUMENTS

WO   WO-2006096097 A1 *  9/2006  ............. H04L 45/00

*Primary Examiner* — Rina C Pancholi
(74) *Attorney, Agent, or Firm* — Ronald Krosky

(57) ABSTRACT

A cross-layer security scheme can be used for a Multi-Input Multi-Output (MIMO) antenna-based large-scale multihop mobile ad hoc network (MANET) with a set of frequency-nonselective, slow/Rayleigh fading, and uncoded channels along with interference combining both physical, link, and higher layer encryption techniques for the payload in addition to signaling. Furthermore, MIMO-aware cross-layer secure MANET physical and key-based logical hierarchical routing proving scalability can be used. Security can be provided in Multi-Hop MIMO MANETs in Physical, medium access control (MAC), and internet protocol (IP) Routing layer. The MIMO-aware MANET IP Routing can include two kinds of routing: Physical Routing such as secure ad-hoc on-demand distance vector (SAODV) in the access MANET and Secure Key-based distributed hash table (DHT) "logical" routing in the backbone MANET. Both security and performance metrics can be employed to improve (e.g., optimize) both network secrecy and throughput/bandwidth capacity.

17 Claims, 22 Drawing Sheets

(51) Int. Cl.
*H04W 40/28* (2009.01)
*H04W 12/04* (2021.01)
*H04W 28/082* (2023.01)
*H04B 17/336* (2015.01)
*H04W 84/18* (2009.01)
*H04B 7/0452* (2017.01)

(52) U.S. Cl.
CPC ....... *H04W 12/04* (2013.01); *H04W 28/0236* (2013.01); *H04W 28/085* (2013.01); *H04W 40/28* (2013.01); *H04B 7/0452* (2013.01); *H04W 84/18* (2013.01)

(58) Field of Classification Search
CPC ..... H04W 84/18; H04B 7/024; H04B 7/0452; H04B 17/336
See application file for complete search history.

(56) References Cited

U.S. PATENT DOCUMENTS

| | | | |
|---|---|---|---|
| 2008/0232258 A1* | 9/2008 | Larsson | H04L 45/00 370/252 |
| 2010/0067362 A1* | 3/2010 | Sakaguchi | H04B 7/0426 370/406 |
| 2013/0100942 A1* | 4/2013 | Rudnick | H04B 7/2656 370/337 |
| 2017/0105163 A1* | 4/2017 | Hu | H04W 40/38 |
| 2018/0176119 A1* | 6/2018 | Abdallah | H04B 7/0413 |

* cited by examiner

# MULTIPLE-INPUT, MULTIPLE-OUTPUT (MIMO) MULTIHOP MOBILE AD-HOC NETWORK (MANET) ROUTING

CROSS-REFERENCE

This application is a divisional application of, and claims priority to, U.S. application Ser. No. 16/149,180 filed on Oct. 2, 2018 and now issued as U.S. Pat. No. 11,019,525. U.S. application Ser. No. 16/149,180 is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

A radio can be used as a communication device. The radio can receive a wireless signal that communicates information. In one example, the wireless signal can contain voice information. After reception, the radio can process the wireless signal such that the voice information is broadcast by way of a speaker. Similarly, the radio can transmit a wireless signal that contains voice information. In another example, similar to audio, video or data can be transferred as well as in a combination of audio, video, and/or data. These radios can be susceptible to damage from various factors.

SUMMARY

In one embodiment, a method can comprise creating a multiple-input, multiple-output (MIMO) multihop mobile ad hoc network (MANET) node set and defining individual nodes of the MIMO MANET node set. The method can also comprise creating a set of traffic flow matrixes in ascending order of total traffic flows based, at least in part, on the individual nodes and initializing a first traffic flow matrix from the set of traffic flow matrixes. The method can additionally comprise setting MIMO constraints for the first traffic flow matrix and setting MIMO protocols for the first traffic flow matrix. The method can also comprise performing a MIMO calculation set in view of the MIMO constraints and MIMO protocols for the first traffic flow matrix and performing routing based, at least in part, on a result of the MIMO calculation set.

In another embodiment, a system, that is at least partially hardware, can comprise an identification component configured to identify a change in a MIMO MANET. The system can also comprise a management component configured to manage routing in the MIMO MANET in response to the change.

In yet another embodiment, a non-transitory computer-readable medium can store processor-executable instructions that when executed by a processor cause the processor to perform a method. The method can comprise performing a processing set on a first traffic flow matrix for a MIMO MANET and determining if a subsequent traffic flow matrix exists for the MIMO MANET. The method can also comprise performing the processing set on the subsequent traffic flow matrix if the subsequent traffic flow matrix exists and plotting total traffic load against overall capacity to produce a plot result if the subsequent traffic flow matric does not exist. The method can additionally comprise finding preferred capacity based, at least in part, on the plot result.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
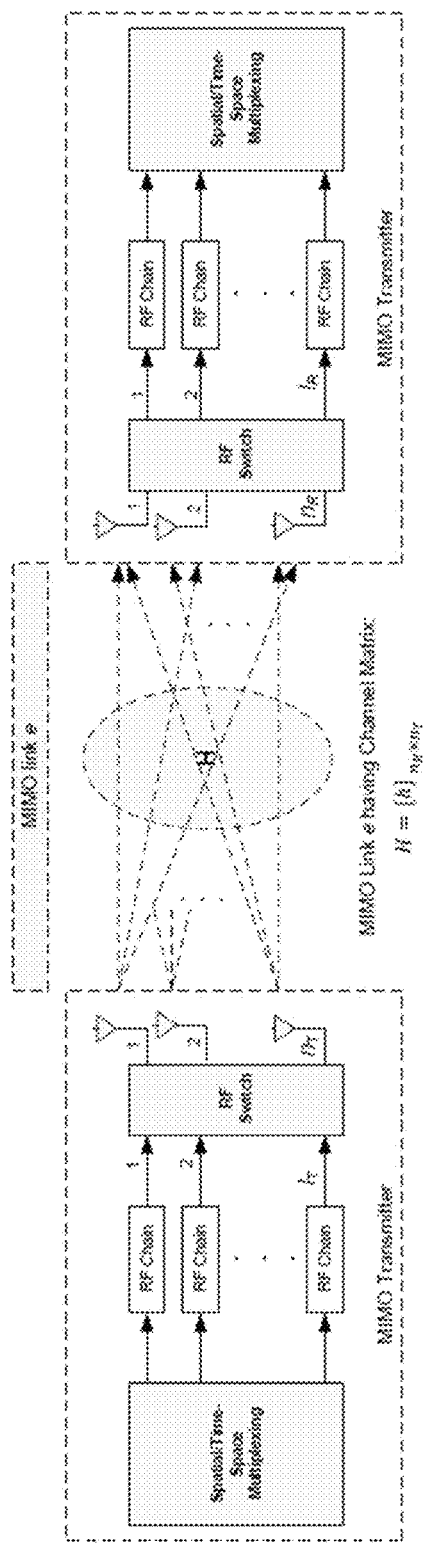
FIG. 1 illustrates one embodiment of a Multi-Input Multi-Output (MIMO) transceiver system communicating in a point to point fashion.

In a dynamic network, various elements can enter and exit at different times. In one example, an element, such as a radio or communications device, can be mobile and when within range of a base station be part of the network and when moved outside of the base station range no longer be part of the network. While some networks can be small, other networks can be quite large. In one example, an infantry unit can have thousands of soldiers with individual communication devices. As many devices enter and exit the network on a continuous basis, aspects disclosed herein can facilitate management of the network in view of these additions and/or subtractions.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

Figure 2:
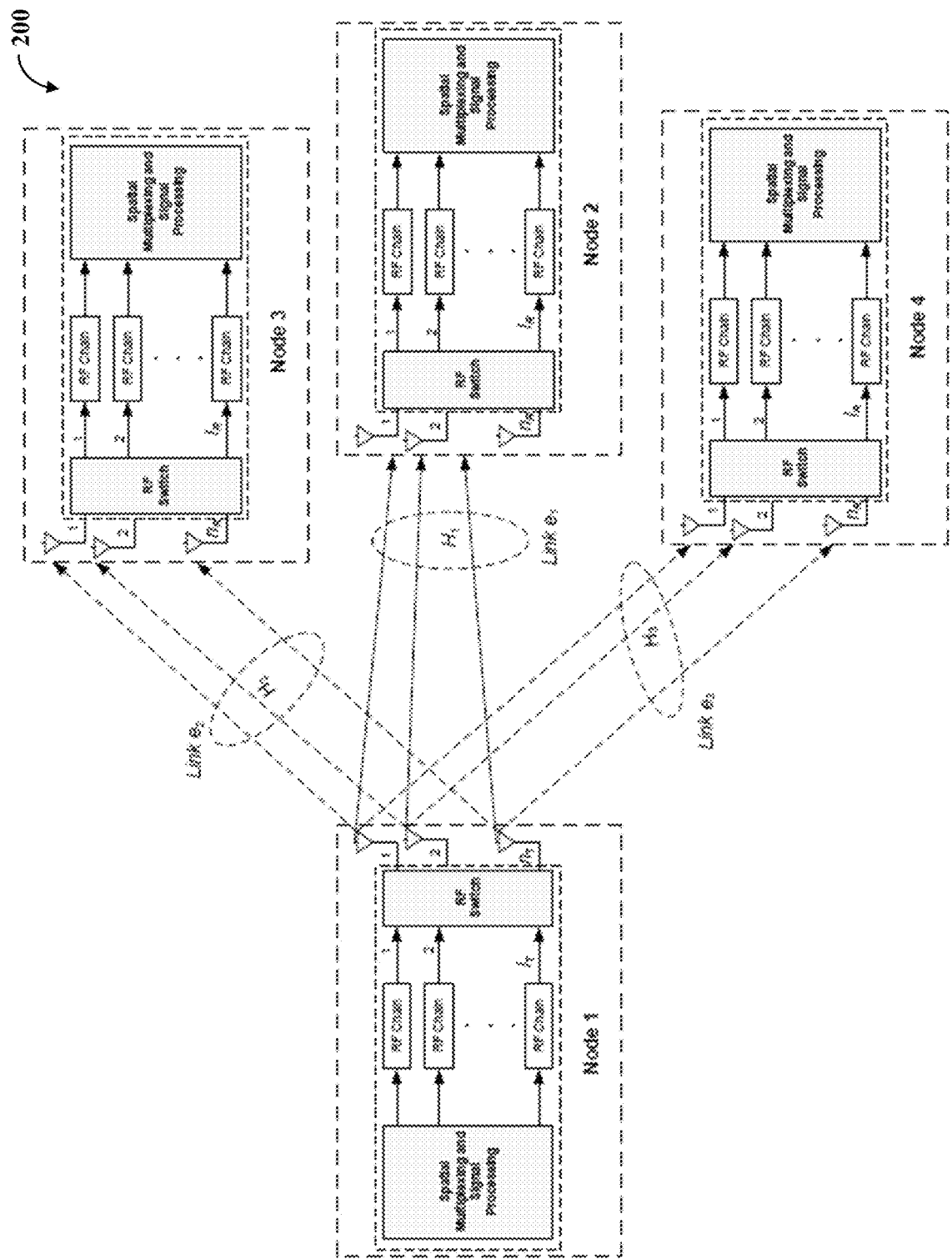
FIG. 2 illustrates one embodiment of a MIMO transceiver system communicating in a multipoint fashion.

FIGS. 1 and 2 illustrate embodiments of a Multi-Input Multi-Output (MIMO) transceiver system 100 and 200 respectively. The system 100 of FIG. 1 can be a single-user MIMO (SU-MIMO). The system 200 of FIG. 2 can be a multi-user MIMO (MU-MIMO).

The demand for high capacity has fueled growing interest in MIMO systems because MIMO various physical layer capabilities, such as increased channel capacity at higher signal-to-noise ratios by way of spatial multiplexing techniques and beamforming using multiple transmitters and receivers. In addition, time-space coding can be used for multiplexing over the MIMO. The MIMO link capacity can be, for example, a function of a capacity of individual channels, a number of channels, a number of antennas used per channel, a number of simultaneous traffic transmit payload streams used over the channels, and the number of interferers considering both transmitters and receivers side of the communicating link. However, it can be more beneficial to use cross-layer design approaches that employ medium access control (MAC), network internet protocol (IP) routing and other layers layer.

The built-in multiple-input multiple-output (MIMO) system physical-layer security provides low-probability-of-interception (LPI) and low-probability-of-detection (LPD) based on transmission properties such as modulations, signals and channels, radiated power, without resorting to source data encryption where no secret keys are employed before transmissions. However, the physical-layer alone may not provide security with 100% probability because of conflicting requirements such as trading transmission power for security and some unrealistic or ideal assumptions for example as eavesdroppers have null-receiving energy, or have no information about the spreading codes, or cannot estimate the propagation channels. The security issue is mainly related to the link vulnerability and end-to-end security services (authentication, confidentiality, integrity, and non-repudiation). The cross-layer security scheme MIMO systems can enhance the security with almost 100% probability where the physical-layer can rely on upper-layer encryption techniques for security.

The MU-MIMO system 200 can use Space-Division Multiple Access (SDMA) (and therefore not function as a SU-MIMO. This technology supports multiple connections on a single conventional channel where different users can be identified by spatial signatures. That is, the MU-MIMO with multiple access channels can function with many multiple-antenna transmitters sending to a single multiple-antenna receiver. SDMA uses spatial multiplexing and enables for a high data rate. This could be achieved by using multiple paths as different channels for carrying data. Another benefit of using the SDMA technique can be used to mitigate the effect of interference coming from adjacent channels/links.

In the MIMO-aware rate adaptation in MAC layer, the security schemes can also be used for MIMO systems. For example, IEEE 802.11n MIMO-based local area networks use many security protocols that may yet to take the advantage of MIMO features exploiting for security. Moreover, a distributed MAC protocol should be able to face the hidden nodes problem on one hand while will be operating in a large number of mobile node on the other hand. A large-scale multihop mobile ad hoc network (MANET) equipped with MIMO antennas, termed as MIMO MANET, which can operate in peer-to-peer (P2P) networking environments can be configured to adopt security in various layers, such as Physical, MAC, and IP Routing. For scalability reason, a large-scale MANET network can have the hierarchical network topology adapting IP layer routing accordingly providing security hand-to-hand. It is seen that MIMO nodes are endowed with many-to-many transmission capability by multiple antennas. It is beneficial to incorporate multi-path routing for end-to-end flows in order to better exploit multi-path diversity and maximize throughput. The multipath routing leads to some problems such as packet reordering and loss recovery.

In hierarchical MIMO MANET topology, network topology hierarchy can be of two levels: Access and Backbone. The access network can comprise mobile ordinary nodes (ONs) controlled by a cluster head (CH) while a cluster head is formed dynamically as the mobile nodes from one place to another. The backbone network can comprise of cluster heads (CHs). In the access network, we are proposing to use the MANET physical secure routing protocol such as secure ad-hoc on-demand distance vector (SAODV) extending to be MIMO-aware. The backbone network can use a MIMO-aware modified Chord distributed hash table (DHT) logical routing protocol. DHT can be a key-based protocol that itself is secure and can be used in the backbone network. DHT will not only enhance inherent security in the routing protocol over the backbone network, it will also make the network more scalable reducing overheads that are created by SAODV because DHT uses unicast communications while SAODV uses broadcast for routing.

The MIMO systems 100 and 200 can employ multiple transmitting antennas and multiple receiving antennas along with signal processing algorithms with spatial and/or space-time multiplexing. The MIMO channel capacity can be expressed at a very high-level as shown in Equation (1) below:

$$C = B \times \log_2\left(1 + n_T \times n_R \times \frac{S}{N}\right) \quad (1)$$

For a good error performance, $n_R \geq n_T$ can be the threshold, and under the spatial multiplexing technique, the capacity of MIMO systems scales linearly with $\min\{n_T, n_R\}$ as approximated in Equation (2):

$$C \approx \min\{n_T, n_R\} \times B \times \log_2\left(1 + \frac{S}{N}\right) \quad (2)$$

where
C=Link Capacity in bits/second
B=Link Bandwidth in Hertz (Hz)
$n_T$=Number of transmitting antennas
$n_R$=Number of receiving antennas
S/N=Signal to Noise (Power) Ratio (SNR)
It can be seen that, under the spatial multiplexing technique, the capacity of MIMO systems scales linearly with $\min\{n_T, n_R\}$. If one considers $n_I$ as number of interferers to the transmitter, then $n_R \geq n_T + n_I$ can be the threshold for good error performance.

With respect to security in the physical layer, the transmission security (TRANSEC) that is a part of communications security (COMSEC) LPI, LPD, and Antijam (A/J) capability can be considered. One type of security can be cross-layer cryptographic security of the payload protected with cryptographic key for the MIMO systems.

Regarding the MIMO MAC/Link layer, one can use the Space-Division Multiple Access as the medium access control protocol in the link layer for MU-MIMO systems. Space-time as the MAC protocol can be used in addition SDMA.

Regarding MAC/Link layer security, one can use the cross-layer cryptographic security for the payload for the MAC/Link and higher layer Security in a stand-along section later. This can be done when TRANSEC is provided in the physical layer to MAC signaling protocol because MAC is a single-hop link protocol. Secure MAC protocol could also be used. The MAC protocol can be aware of the physical layer MIMO antenna configurations working in cross-layer mode.

With regard to the MIMO Routing/Network Layer, the routing protocol in the network layer used for discovery of the end-to-end route-path for transferring the payload could be very vulnerable to attacks. Again, two-level of hierarchical routing can be used: Physical Routing Protocol such as SAODV in the access MANETs and Logical routing protocol such as key-based DHT in the backbone MANET. In this, both physical and logical routing signaling protocols can be used in addition to the general cross-layer cryptographic security for the payload.

In contrast to single input-single output (SISO), the key of the MIMO-capable networking is that, by using different sizes (that is, different numbers of antenna combination), a set of MIMO channels can be constructed to take advantage of spatial multiplexing and/or spatial diversity. MIMO channels can be considered orthogonal when the antenna weights at transmitters and when transmissions over Eigen-modes of the channel are taken into calculation. By using different sizes, a set of MIMO channels can be constructed to take advantage of spatial multiplexing and/or spatial diversity.

Figure 3:
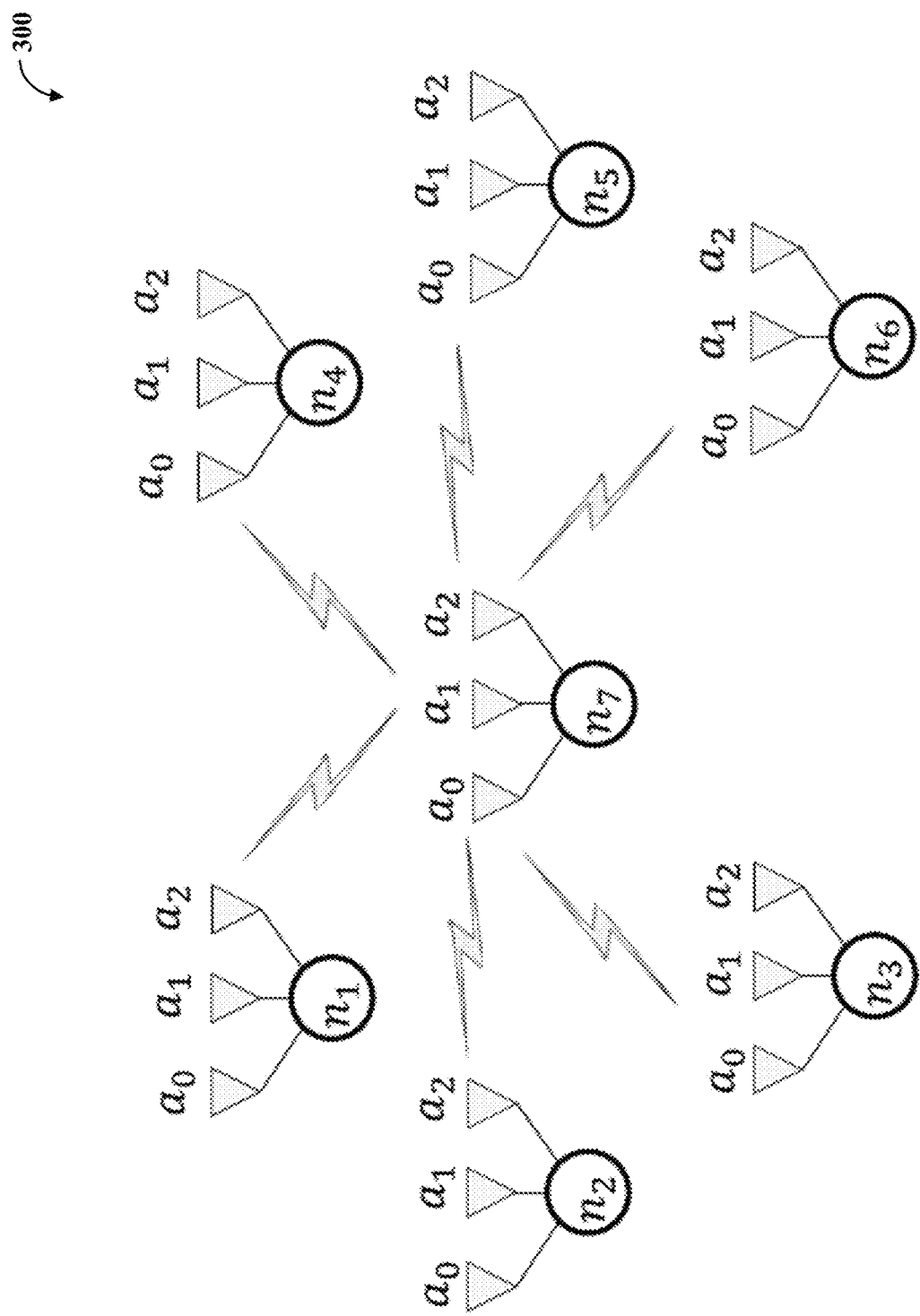
FIG. 3 illustrates one embodiment of a 7-node MIMO network architecture where each node is illustrated as having three antennas.
Figure 4:
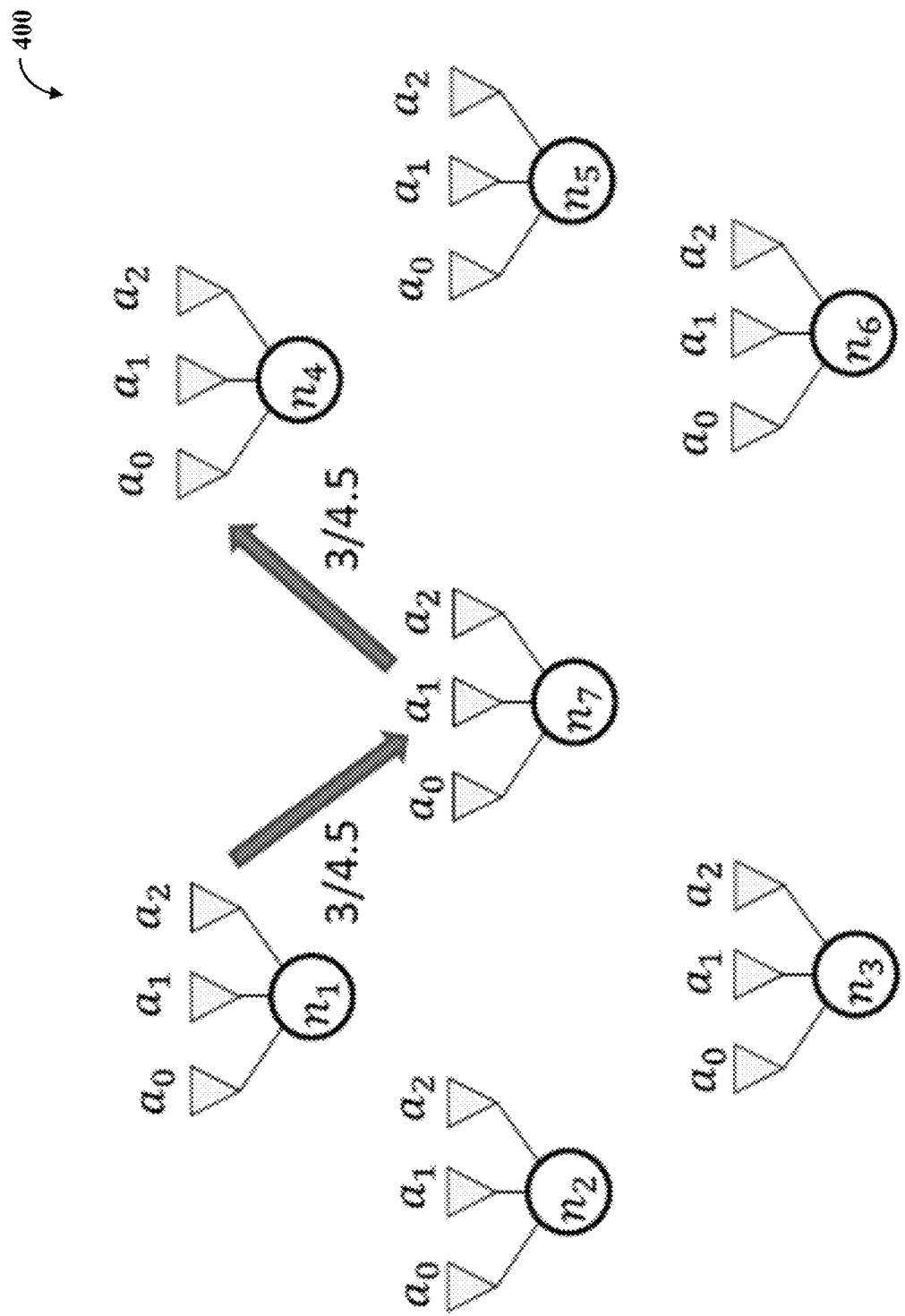
FIG. 4 illustrates one embodiment of a 7-node MIMO network architecture where each node is illustrated as having three antennas.
Figure 5:
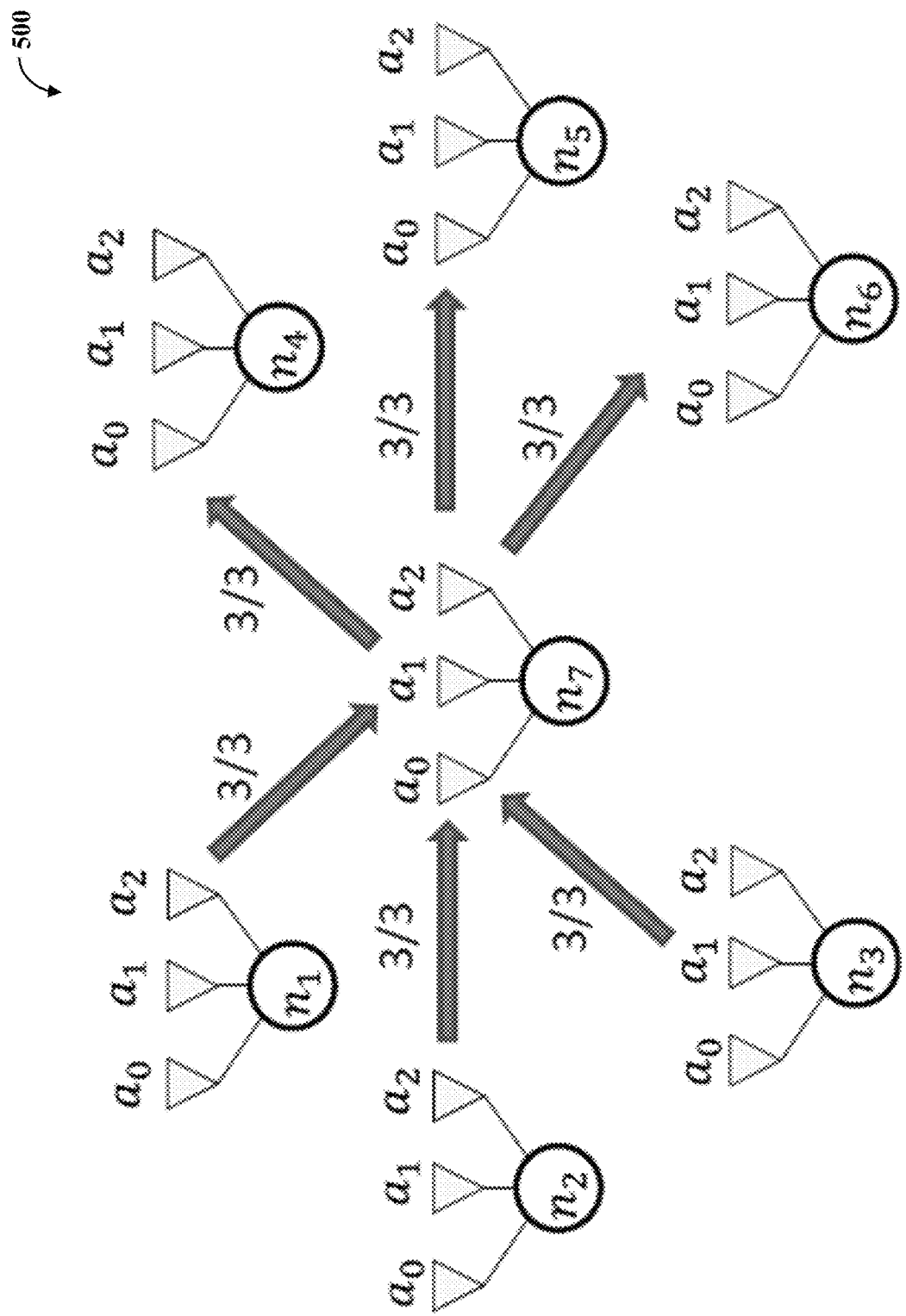
FIG. 5 illustrates one embodiment of a 7-node MIMO network architecture where each node is illustrated as having three antennas.

FIGS. 3-5 illustrate embodiments of a 7-node $\{n_1, n_2, n_3, n_4, n_5, n_6, n_7\}$ MIMO network architecture 300-500 where each node is illustrated as having three antennas $\{a_0, a_1, a_3\}$. FIG. 3 has the architecture 300 in its base form, FIG. 4 has the architecture 400 in a MIMO-unaware routing form, and FIG. 5 has the architecture 500 in a MIMO-aware routing form. Consider the source-destination traffic matrix shown in Table 1. It shows that each of three nodes $\{n_1, n_2, n_3\}$ has 3 units of traffic to be sent to each of nodes $\{n_4, n_5, n_6\}$, respectively.

TABLE 1

Source Destination Traffic Flow (f) Matric

| Source Node (s) | Destination Node (d) | | | | | | |
|---|---|---|---|---|---|---|---|
| | $n_1$ | $n_2$ | $n_3$ | $n_4$ | $n_5$ | $n_6$ | $n_7$ |
| $n_1$ | — | — | — | 3 | — | — | — |
| $n_2$ | — | — | — | — | 3 | — | — |
| $n_3$ | — | — | — | — | — | 3 | — |
| $n_4$ | — | — | — | — | — | — | — |
| $n_5$ | — | — | — | — | — | — | — |
| $n_6$ | — | — | — | — | — | — | — |
| $n_7$ | — | — | — | — | — | — | — |

One can assume that each of the three nodes $\{n_1, n_2, n_3\}$ sends 3 units of traffic to be sent to each of the nodes $\{n_4, n_5, n_6\}$, respectively via node $n_7$. Interestingly, if it is assumed the capacities of one antenna, a combination of two antennas, and a combination of 3 antennas are 3, 4, and 4.5, respectively, one can make, for example, routing strategy as follows:

(i) Classical Way (illustrated in FIG. 4) where all 3 antennas are used by each of the nodes $\{n_1, n_2, n_3, n_4, n_5, n_6, n_7\}$ as the Internet Protocol (IP) network routing layer is not aware of the MIMO Physical and/or MIMO MAC layer or (ii) New Cross-Layer Way (illustrated in FIG. 5) where one antenna is used by each of the nodes $\{n_1, n_2, n_3, n_4, n_5, n_6, n_7\}$ as the network routing layer is aware of the MIMO Physical and/or MIMO MAC layer working cooperatively with physical MIMO antenna layer and MIMO MAC layer for rearranging the MIMO antenna dynamically for routing of the particular traffic from the source to the destination.

In case (i), it can be seen that node $n_7$ will be using all of its 3 antennas $\{a_0, a_1, a_3\}$ simultaneously at any given time for receiving traffic from any given node because the network routing layer is not MIMO-aware to take advantage of the antenna reconfiguration dynamically coordinated among the neighboring MIMO nodes based on the traffic demand. Three nodes $\{n_1, n_2, n_3\}$ will be sending 9 units of traffic simultaneously while the receiving node $n_7$. Also, node $n_7$ has the capacity to receive only 4.5 units of traffic at most by using its 3 antennas $\{a_0, a_1, a_3\}$ simultaneously at any given time. So, it can only receive traffic from only one node (say, $n_1$) at any given time. FIG. 4 illustrates the sequential step of routing: 3-antenna channel—only one node at a time can be serving. Conversely, case (ii) will be a better choice where the MIMO-aware routing can adaptively select the set of MIMO channels to route traffic to route traffic such that all the 9 units of traffic demand can be satisfied simultaneously as shown in FIG. 5: 1-antenna channel—all 3 nodes can be transferring traffic at the same time.

Figure 6:
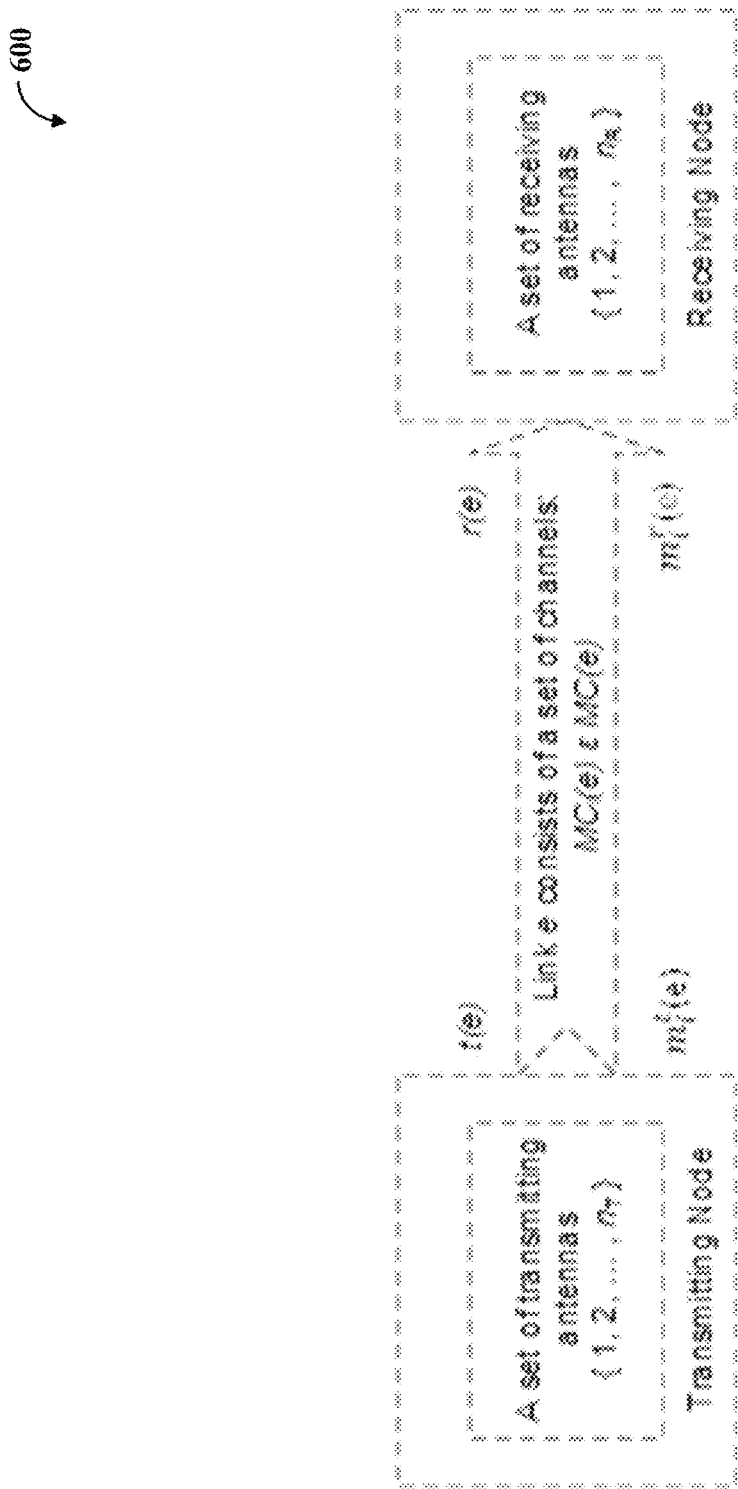
FIG. 6 illustrates one embodiment of a logical representation of a MIMO Link, Channels, and Antenna concept.

FIG. 6 illustrates one embodiment of a logical representation 600 of a MIMO Link, Channels, and Antenna concept. Unlike SISO, the concept of MIMO channel (MC) can be the MIMO spatial channel over a link that uses a designated set of antennas and corresponds to a specific MIMO operation mode. A MIMO link can constitute a set of MIMO channels as follows:

e can be the MIMO link that has the transmitting end denoted as t(e) and the receiving end denoted as r(e)

(e,i) denotes MIMO channel i over link e

MC(e) can be a set of MIMO channels (MC) over link e $MC_i(e)$ denotes element i of a MIMO channel (MC) over link e $m_i^t(e)$ represents the number of antennas (or simply as "size") associated with channel i at the transmitting side over link e $m_i^r(e)$ represents the number of antennas (or simply as "size") associated with channel i at the receiving side over link e Each element of a MIMO channel over link e can be denoted as $MC_i(e)$. However, each element of a MIMO channel over link e that is, $MC_i(e) \in MC(e)$, has a "size or number of antennas" denoted as $m_i^t(e)$ at the transmitter side and $m_i^r(e)$ at the receiver side of link e Each MIMO channel (e,i) over link e can be associated with a set of transmitting antennas {that is, $m_i^t(e)=$ 1, 2, ..., or $n_T$} at the transmitting node t(e) and a set of receiving antennas {that is, $m_i^r(e)=1, 2, ...,$ or $n_R$} at the receiving node $N_v^{ant}$ represents the total number of antennas that a node v has. For example, $N_v^{ant}=n_T$ indicates that node v is using $n_T$ numbers of transmitting antennas. In the same token, $N_k^{ant}=n_R$ indicates that node k is using $n_R$ numbers of receiving antennas $N_{t(e)}^{ant}$ represents the number of antennas used by a node at the transmitting side over MIMO link e $N_{r(e)}^{ant}$ represents the number of antennas used by a node at the receiving side over MIMO link e f represents the traffic flow session for an estimation period, say $\tau$ s(f), d(f) represents source and destination node for traffic flow session f for an estimation period, say $\tau$ (Table 1), respectively Each data link e has capacity $c_i(e)$ on MIMO channel i, and there is an estimated capacity for a given MIMO channel over a link for an estimation period, say $\tau$ $x_i^f(e)$ represents end-to-end traffic flow session f over MIMO channel i using data link e and has traffic flow for an estimation period, say $\tau$ $$g_i(e) = \sum_f \frac{x_i^f(e)}{c_i(e)}$$

represents the capacity utilization of MIMO channel i over link e for all flows of end-to-end traffic flow session f for an estimation period, say $\tau$ $y_R^f(e)$ represents the traffic flow session f over the transmitting end of link e for an estimation period, say $\tau$ $y_R^f(e)$ represents the traffic flow session f over the receiving end of link e for an estimation period, say $\tau$ $E_{in}(v)$ represents total number of MIMO links $\Sigma_i e_i$ that are sending traffic in to MIMO node v simultaneously for an estimation period, say $\tau$ $E_{out}(v)$ represents total number of MIMO links $\Sigma_k e_k$ that are transmitting traffic out to different nodes by MIMO node v simultaneously for an estimation period, say $\tau$ $E'$ is the set of directed edges which indicate the interference from a transmitter to nodes within its interference range during data transmission $I_{e,i,\tau}$ is the indicator variable that has value 1 if and only if channel i is active over link e at time slot $\tau$ One can assume that parameter $u_{i,a_j,e}\{a_j, j=1, 2, \ldots,$ or $n_T\}$ represents each MIMO channel (e,i) associated with a particular designate antenna from a set of antennas $\{a_j, j=1, 2, \ldots,$ or $n_T\}$ of a node at the transmitting end t(e) over link e. Note that this parameter is set to unity (that is, $u_{i,a_j,e}=1$) if and only if MIMO channel i over link e uses that designated antenna $a_j$ of node t(e) for transmission, otherwise is set to zero (that is, $u_{i,a_j,e}=0$). Consider an example of the architecture 500 of FIG. 5 and Table 1 where $n_7$ transfers traffic to node $n_4$ using three antennas $\{a_0, a_1, a_3\}$. These antennas of node $n_7$ can be used to compose different MIMO channels for link e for communicating with node $n_4$, for example, as follows:

Case a: Only one antenna is used by each channel while channels are designated as channels 1, 2, and 3 over link e, that is, (e, 1), (e, 2), and (e, 3). Thus a result for both transmitting and receiving end over link e: $\{m_i^t(e)=1, i=1, 2, 3\}$ and $\{m_i^r(e)=1, i=1, 2, 3\}$. Consequently, the following set can be used: $u_{i,a_j,e}=1$, $\{a_j, j=1, 2, 3\}$ and $\{i=j\}$ while $u_{i,a_j,e}=0$, $\{a_j, j=1, 2, 3\}$ and if $\{i \neq j\}$.

Case b: All three antennas are used by each channel simultaneously while channels are designated as channels 4, 5, and 6 over link e, that is, (e, 4), (e, 5), and (e, 5). Thus for both transmitting and receiving end over link e the result can be: $\{m_i^t(e)=3, i=4, 5, 6\}$. Consequently, the following set can be used: $u_{i,a_j,e}=1$, $\{a_j, j=1, 2, 3\}$ and $\{i=4, 5, 6\}$. If the MIMO transmission strategy used for all channels 4, 5, and 6 is spatial multiplexing, that is, independent data streams are transmitted simultaneously from the three antennas, and the receiver uses at least three antennas for successful decoding, therefore $\{m_i^r(e)=3, i=4, 5, 6\}$. Note that if the space-time coding is used instead of spatial multiplexing, the lesser number of antennas can be used at the receiver side.

Figure 7:
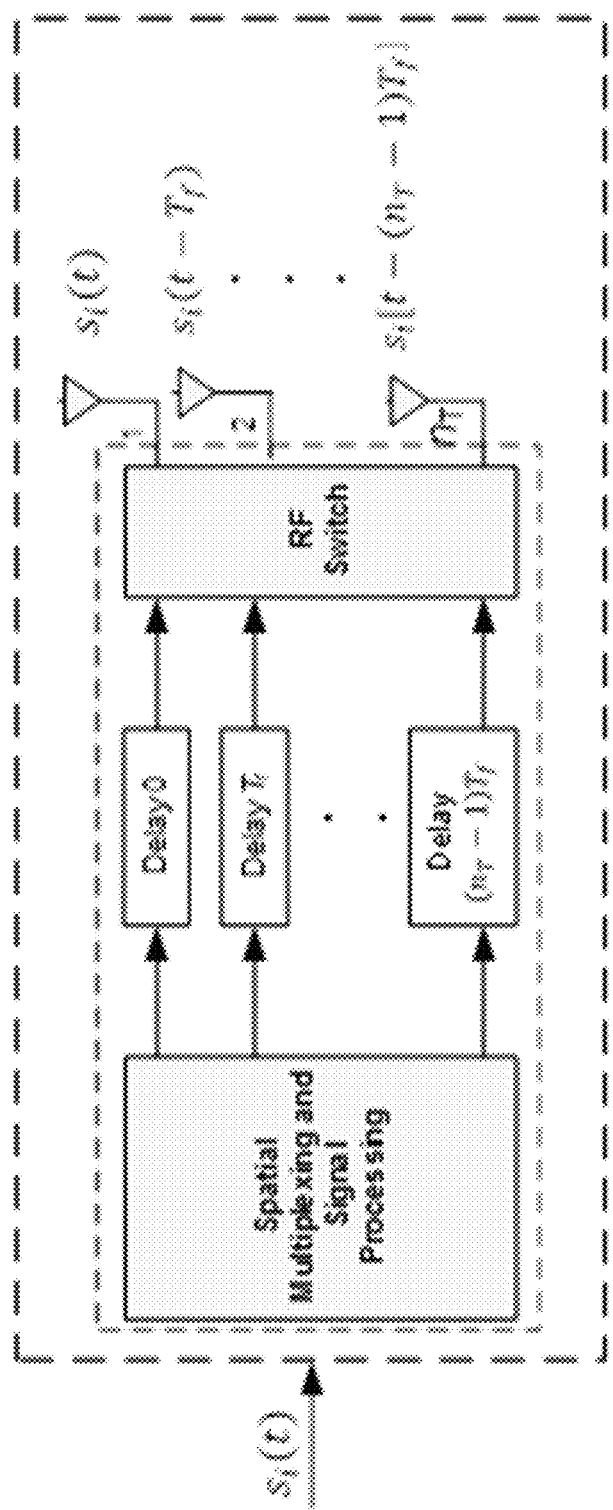
FIG. 7 illustrates one embodiment of a delay diversity MIMO system.

Due to the specific features of MIMO-based network, the following MIMO-based networking constraints can be considered in design: Antenna Compatibility Constraint, MIMO Transceiver Degree Constraint, and MIMO Channel, Link, and Node Flow Conservation Constraints FIG. 7 illustrates one embodiment of a delay diversity MIMO system 700. A desire can be to secure the payload of the traffic that is being carried over the MU-MIMO channels. To achieve this desire, cross-layer security for the MIMO payloads can be employed. A set of frequency-nonselective, slow/Rayleigh fading, and uncoded channels can be employed and the received signal r(t) at the MIMO receiver can be expressed in matrix form as follows:

$$r(t) = H(t)S(t) + N(t) \quad (3)$$

where r(t), H(t), S(t), and N(t) are received ($n_R \times 1$) signal matrix, ($n_R \times n_T$) channel matrix, ($n_T \times 1$) transmitted signal matrix, and ($n_R \times 1$) noise matrix, respectively, and can be expressed as follows:

$$r(t) = \begin{bmatrix} r_1(t) \\ r_2(t) \\ \vdots \\ r_{n_R}(t) \end{bmatrix}, H(t) = \begin{bmatrix} h_{1,1}(t) & h_{1,2}(t) & \cdots & h_{1,n_T}(t) \\ h_{2,1}(t) & h_{2,2}(t) & \cdots & h_{2,n_T}(t) \\ \cdots & \cdots & \cdots & \cdots \\ h_{n_R,1}(t) & h_{n_R,2}(t) & \cdots & h_{n_R,n_T}(t) \end{bmatrix}, \quad (4)$$

$$N(t) = \begin{bmatrix} N_1(t) \\ N_2(t) \\ \cdots \\ N_{n_R}(t) \end{bmatrix}$$

Similar to interference, security can be included in the delay diversity MIMO system 700 that has a set of frequency-nonselective, slow/Rayleigh fading, and uncoded channels. In cross-layer payload security, security can be provided with almost 100% probability while the physical layer security alone may not be good enough to achieve this goal. The system 700 can be considered consider a single point-to-point MIMO system with arrays of $n_T$ transmit and $n_R$ receive antennas for simplicity. The transmitted data is denoted as a vector ($s_1(t); s_2(t); \ldots ; s_T(t)$). Typically, an array with $n_T$ transmit antennas sends a $n_T \times T$ signal matrix S over T time samples to $n_R$ receive antennas. The transmission signal matrix $S_{inf}$ can be formed as:

$$S_{inf} = \begin{bmatrix} S_1(t) & S_2(t) & \cdots & S_T(t) \\ S_1(t-T_f) & S_1(t-T_f) & \cdots & S_1(t-T_f) \\ \vdots & \vdots & \vdots & \vdots \\ S_1(t-jT_f) & S_1(t-jT_f) & \cdots & S_1(t-jT_f) \\ \vdots & \vdots & \cdots & \vdots \end{bmatrix} \quad (5)$$

where $s_i(t-jT_f)$, ($0 \leq j < (n_T-1)$), is the fundamental transmission information signal, and $T_f$ represents the time delay. This is a delay diversity scheme in which multiple copies of the same symbol are transmitted through multiple antennas in different time slots as shown the system 700. However, it may not be desirable to directly transmit the signal given by Equation (5). Let $S_{noise}$ be a $T \times n_N$ noise matrix defined as:

$$S_{noise} = \begin{bmatrix} w_{1,1} & w_{1,2} & \cdots & w_{1,T} \\ w_{2,1} & w_{2,2} & \cdots & w_{2,T} \\ \vdots & \vdots & \ddots & \vdots \\ w_{n_N,1} & w_{n_N,2} & \cdots & w_{n_N,T} \end{bmatrix} \quad (6)$$

where $n_N \leq n_T$ and each row in $S_{noise}$ is a set of pseudorandom sequences with the length T. The following binary control pseudorandom sequence matrix $S_{control}$ can also be defined as:

$$S_{control} = \begin{bmatrix} v_{1,1} & v_{1,2} & \cdots & v_{1,T} \\ v_{2,1} & v_{2,2} & \cdots & v_{2,T} \\ \vdots & \vdots & \ddots & \vdots \\ v_{n_N,1} & v_{n_N,2} & \cdots & v_{n_N,T} \end{bmatrix} \quad (7)$$

Each row in $S_{control}$ can be a set of pseudorandom sequences with the length T, and the elements in $S_{control}$ are denoted by binary bits with above notations. The transmission signals can be represented with the following matrix X:

$$X = \begin{bmatrix} x_1^1 & x_1^2 & \cdots & x_1^T \\ x_2^1 & x_2^2 & \cdots & x_2^T \\ \vdots & \vdots & \ddots & \vdots \\ x_{n_N}^1 & x_{n_N}^2 & \cdots & x_{n_N}^T \\ x_{n_N+1}^1 & x_{n_N+1}^2 & \cdots & x_{n_N+1}^T \\ \vdots & \vdots & \ddots & \vdots \\ x_{n_T}^1 & x_{n_T}^2 & \cdots & x_{n_T}^T \end{bmatrix} \quad (8)$$

where the element $x_i^j$ is determined by:

$$\begin{cases} x_i^j = s_i[t-(j-1)T_f], \ j \leq n_N, \ v_{j,i} = 0 \\ x_i^j = w_{j,i}, \ j \leq n_N, \ v_{j,i} = 1 \\ x_i^j = s_i[t-(j-1)T_f], \ j > n_N \end{cases} \quad (9)$$

In other words, if the control element $v_{j,i}$ is zero, the corresponding antenna can transmit the information signal. Otherwise, it will transmit the noise signal.

Figure 8:
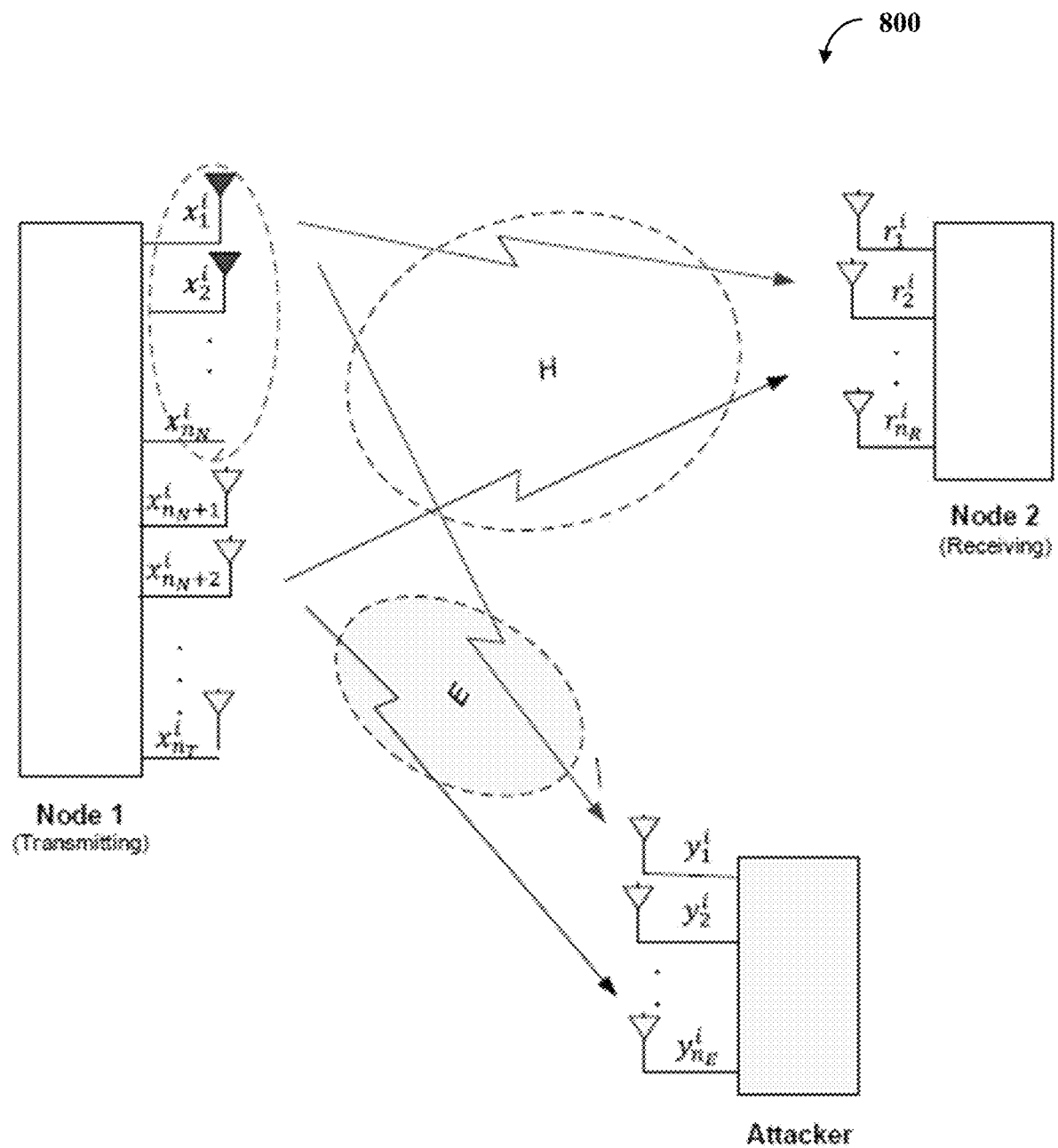
FIG. 8 illustrates one embodiment of an antenna array redundancy model with a transmitter, a receiver, and an attacker.
Figure 9:
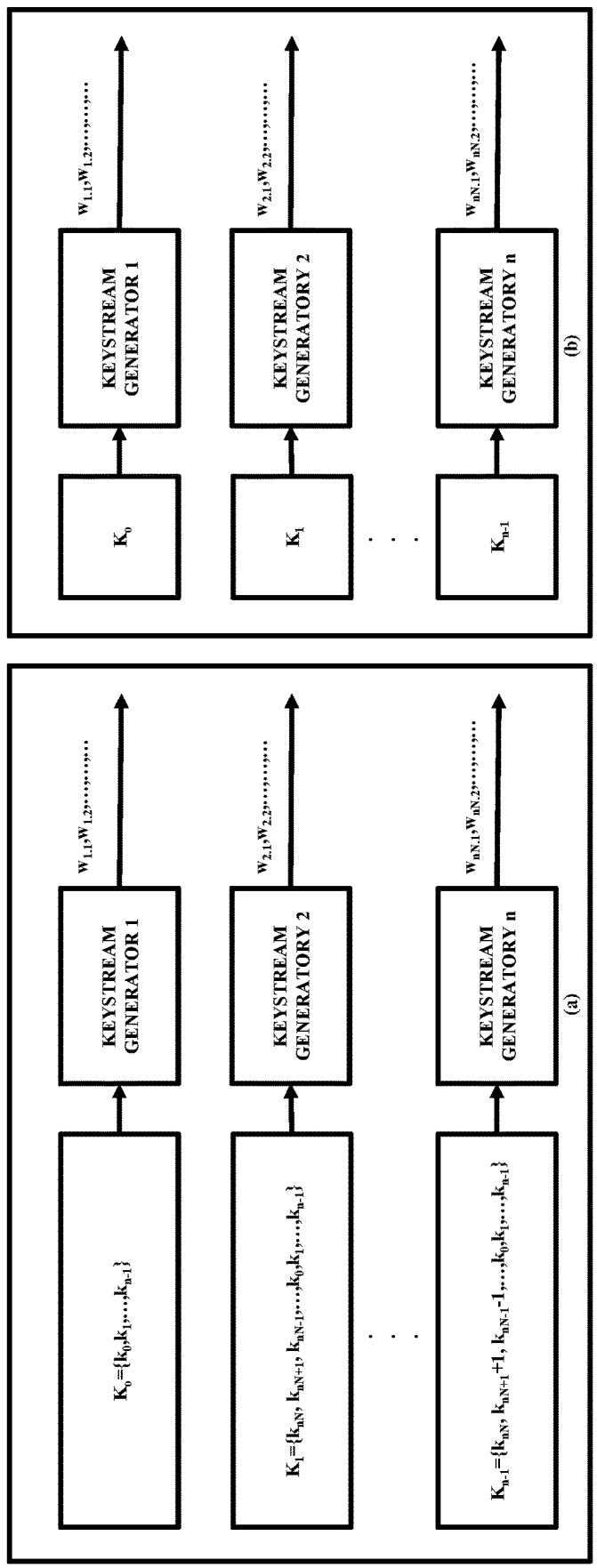
FIG. 9 illustrates one embodiment of a key generator.

FIG. 8 illustrates one embodiment of an antenna array redundancy model 800 with a transmitter (node 1), a receiver (node 2), and an attacker while FIG. 9 illustrates one embodiment of a key generator—part (a) with $K_0$ being a base and part (b) with each row having its own secret key. A communication can be transmitted from the transmitter with the goal of reaching the receiver, therefore making the receiver an intended receiver. Both the noise sequences $S_{noise}$ and the control sequences $S_{control}$ are the stream ciphers generated by a set of keys. Both of them or one of them can be the secret keys between the transmitter and the intended receiver. The generators of secret keystream $S_{noise}$ and $S_{control}$ are shown in FIG. 8. For secret keystream $S_{noise}$ and $S_{control}$ the principle of generation is same. The stream ciphers can be a preferred (e.g., optimal) selection for its fast implement speed. Stream ciphers can have ideal two-level autocorrelation and randomness properties such as balance distribution, long period, ideal tuple, whose autocorrelation function is a delta function. This function can be similar with those of Gaussian white noise. An example can be m-sequence. But the linear complexity of m-sequence can be very low. Another good candidate is the WG stream ciphers which generate pseudorandom sequence with high complexity and the same autocorrelation functions as m-sequences.

In FIG. 9(a) the secret key $K_0$ is firstly generated, then the other keys are the shift of $K_0$, which let the output keystream be different when the keystream generators have the same structure. In this scheme, $K_0$ is the key that legitimate communication partners share together. Therefore, the size of secret key is same as those of some cryptographic systems even if the secret keystream is a matrix.

The disadvantage of this scheme is that the whole system will be destroyed when the attacker get the secret key. In FIG. 9(b) every row of the keystream matrix has its own secret key. There are n different secret keys which are independent each other. The size of the secret key is bigger than the usual situation. The advantage of this scheme is that the leak of one or several secret keys only let the secret level of the system become lower and cannot let the whole system be destroyed.

It can be assumed that there are $n_T$ transmit antennas, $n_R$ receive antennas for the intended receiver, and $n_A$ receive antennas for the attacker. A $n_R \times n_T$ matrix $H^{(i)}$ can be employed to describe the channel from the transmitter to the intended receiver in the i-th time slot and a $n_A \times n_T$ matrix $E^{(i)}$ to denote the channel from the transmitter to the attacker in the i-th time slot. $H^{(i)}$ and $E^{(i)}$ can be defined as follows:

$$H^{(i)} = \begin{bmatrix} h^i_{1,1} & h^i_{1,1} & \cdots & h^i_{1,n_T} \\ h^i_{2,1} & h^i_{2,2} & \cdots & h^i_{2,n_T} \\ \vdots & \vdots & \cdots & \vdots \\ h^{(i)}_{n_R,1} & h^{(i)}_{n_R,2} & \cdots & h^{(i)}_{n_R,n_T} \end{bmatrix} \quad (10)$$

and $$E^{(i)} = \begin{bmatrix} E^i_{1,1} & E^i_{1,1} & \cdots & E^i_{1,n_T} \\ E^i_{2,1} & E^i_{2,2} & \cdots & E^i_{2,n_T} \\ \vdots & \vdots & \cdots & \vdots \\ E^{(i)}_{n_A,1} & E^{(i)}_{n_A,2} & \cdots & E^{(i)}_{n_A,n_T} \end{bmatrix} \quad (11)$$

In the i-th time slot, the signal in the j-th receiving antennas of the intended receiver and the attacker can be respectively:

$$r_j^i = \Sigma_{t=1}^{nN}(h_{j,t}^i x_t^i + n_j^i) + \Sigma_{k=n_N+1}^{nT}(h_{j,k}^i x_k^i + n_j^i) \quad (12)$$

and $$y_j^i = \Sigma_{t=1}^{nN}(E_{j,t}^i x_t^i + \tilde{n}_j^i) + \Sigma_{k=n_N+1}^{nT}(E_{j,k}^i x_k^i + \tilde{n}_j^i) \quad (13)$$

where $r_j^i$ and $y_j^i$ denote the signals received by the legitimate user and the attacker in time slot i, respectively. $n_j^i$ and $\tilde{n}_j^i$ are the channel noises for the legitimate receiver and the attacker respectively.

In some time slots the first terms in Equations (12) and (13) can become noise. The legitimate receiver knows the noise, so this term can be removed. However, the attacker doesn't know the pseudo-sequence $S_{control}$. Hence, this term provides another noise component and the total noise becomes high. As a result the attacker's signal is a degraded version of the legitimate receiver's signal. It can be possible to achieve a non-zero secrecy capacity.

For the intended receiver, a maximum ratio combining diversity can be used. In the i-th time slot, the output signal is a linear combination of a weighted replica of all of the received signals, which is given by:

$$\tilde{r}^i = \Sigma_{j=1}^{nR} \alpha_j r_j^i \quad (14)$$

where $\alpha_j$ is a weight factor for the receive antenna j. In the maximum ratio combining, the weight factor of each receive antenna is chosen to be in proportion to the ratio of its own signal voltage and the noise power. Let $A_j$ and $\varphi_j$ be the amplitude and the phase of the received signal $r_j^i$, respectively. Assuming that each receive antenna has the same average noise power, the weight factor $\alpha_j$ can be represented as:

$$\alpha_j = A_j e^{-i\varphi_j} \quad (15)$$

The decision rule for the Maximum Likelihood (ML) decoder can be stated as:

$$\hat{s}_i(t) = \arg\min \|\tilde{r}^i - \Sigma_{k=1}^{nR} \Sigma_{j=1}^{nT} h_{k,j}^i x_j^i\|^2 \quad (16)$$

$\hat{s}_i(t)$ is the estimated transmission signal in the i-th time slot. Because the intended receiver knows the Equation (9), it can eliminate the noise by substituting the former slot estimation transmission signal and $w_{i,j}$ into $x_t^i$.

The attackers can use the same method that described from Equations (13) through (16). Hence they don't know the $S_{control}$. Therefore, the noise can't be canceled. They can also use the original Vertical Layered Space-Time (VLST) receiver based on a combination of interference suppression and cancellation, which separates the data streams and thereafter independently decodes each stream. An algorithm for this can be described as the following:

Let the order set, $$K_{Opt} = \{k_1, k_2, \ldots, k_{n_T}\} \quad (17)$$

be a permutation of the integers $\{1, 2, \ldots, n_T\}$ specifying the order in which components of i-th slot transmitted symbol vector $x^{(i)} = \{x_1^i, x_2^i, \ldots, x_{n_T}^i\}^T$ are extracted. A particular ordering $K_{opt}$ can be determined which is optimal in a certain sense. The detection algorithm which operates on received signal $y^{(i)} = \{y_1^i, y_2^i, \ldots, y_{n_A}^i\}^T$ can be employed where the receiver signal detection scheme uses zero forcing (ZF) algorithm.

The secrecy capacity $C_s$ can be defined as the maximum rate at which a transmitter can reliably send information to an intended receiver such that the rate at which the attacker obtains this information is arbitrarily small. With this, the secrecy capacity can be the maximal number of bits that a transmitter can send to an intended receiver in secrecy for each use of the channel. If the channel from the transmitter to the intended receiver and the channel from the transmitter to the attacker have different bit error probabilities (BER) $\epsilon$ and $\delta$, respectively, that is, the common input to channel is the binary random variable X, and the binary random variables received by the legitimate and the attacker are Y and Z where:

$$P_{Y|X_{(y|x)}} = 1-\epsilon, \text{ if } x=y$$

$$P_{Y|X_{(y|x)}} = \epsilon, \text{ if } x \neq y$$

$$P_{Z|Y_{(z|x)}} = 1-\delta, \text{ if } x=z$$

$$P_{Z|X_{(z|x)}} = \delta, \text{ if } x \neq z \quad (18)$$

Without loss of generality, it can be assumed that $\epsilon \leq 0.5$ and $\delta \leq 0.5$. The secret capacity $C_s$ can be:

$$C_s = \begin{cases} h(\delta) - h(\epsilon), & \text{if } \delta > \epsilon \\ 0, & \text{otherwise} \end{cases} \quad (19)$$

where h denotes the binary entropy function defined by:

$$h(p) = p \log_2 p - (1-p) \log_2(1-p) \quad (20)$$

Knowing the BER results of the intended receiver and the attacker, it can be determined that the secrecy capacity $C_s$, by way of Equation (17), can be solved with the use of ZF algorithm. The idea behind the calculation of secrecy capacity can be the BER degraded by the attacker. In addition, BER is degraded by thermal noises, interferences from neighboring nodes, and fading (e.g. Rayleigh). A component can calculate the contribution to the BER by different interferences other than the attacker. The BER degraded by the attackers vs. BER degraded by all different kinds of interferences combined can be determined. This allows a component to composite secrecy capacity the multihop MIMO MANET networks.

Figure 10:
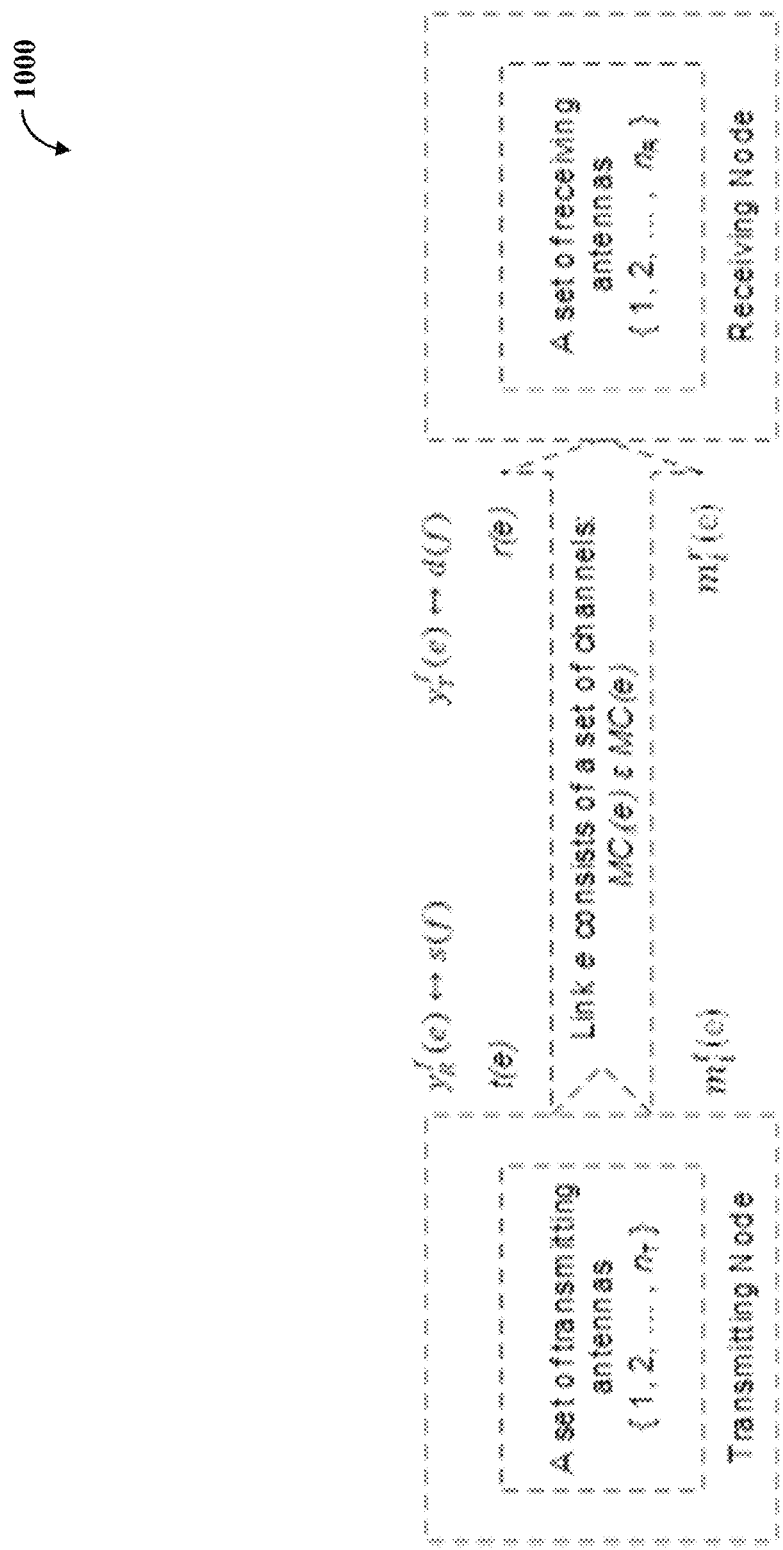
FIG. 10 illustrates one embodiment of schematic view of MIMO channels, channel capacity, channel traffic flow, channel utilization, and transmitting/receiving end link traffic flow.

FIG. 10 illustrates one embodiment of schematic view 1000 of MIMO channels, channel capacity, channel traffic flow, channel utilization, and transmitting/receiving end link traffic flow. A MIMO-based network differs from its counterpart conventional networks fundamentally because it depends on the size of the antenna arrays of nodes in addition to depending on network topology and channel conditions what the conventional network does. For a transmission link between a node pair, the link capacity can be chosen from a set of varied capacities of different antenna combinations and strategies. More than one combination may be used simultaneously to form several MIMO channels. The actual capacity of each MIMO channel can be estimated on a periodic basis and the statistics is used in routing decision.

How each MIMO channel and its capacity is used can be relevant to forming a given link using different sets of antenna combination. The view 1000 can be employed to define a few MIMO-based constraints. In a MIMO-aware routing situation, a MIMO network node may establish many links simultaneously for transferring traffic. MIMO transceiver degree, antenna compatibility, and flow conservation in the channel and the link can impose new constraints in both physical and medium access control (MAC) layer. In addition, the network routing layer of MIMO networks can be heavily influenced by these constraints.

The basic flow constraints can be that a given MIMO channel over link e shall not carry more traffic flow for given period of time than its own capacity. That is, each MIMO channel can be configured to satisfy the following flow constraint:

$$\Sigma_f x_i^f(e) \leq c_i(e), \forall e, \forall i \in MC(e) \qquad (21)$$

This can be simplified as:

$$\sum_f \frac{x_i^f(e)}{c_i(e)} = g_i(e) \leq 1, \forall e, i \in MC(e) \qquad (22)$$

A MIMO link e can have different set of antennas configuration that may be different at the transmitting end and the receiving end of the link. However, the traffic flow over a given link can be the same for both the transmitting end and the receiving end. This can imply the following:

$$y_T^f(e) = y_R^f(e) \qquad (23)$$

With this, a given link e can be:

$$\Sigma_{e:t(e)=s(f)} \Sigma_{i \in MC(e)} x_i^f(e) = \Sigma_{e:r(e)=d(f)} \Sigma_{i \in MC(e)} x_i^f(e); \forall f \qquad (24)$$

Figure 11:
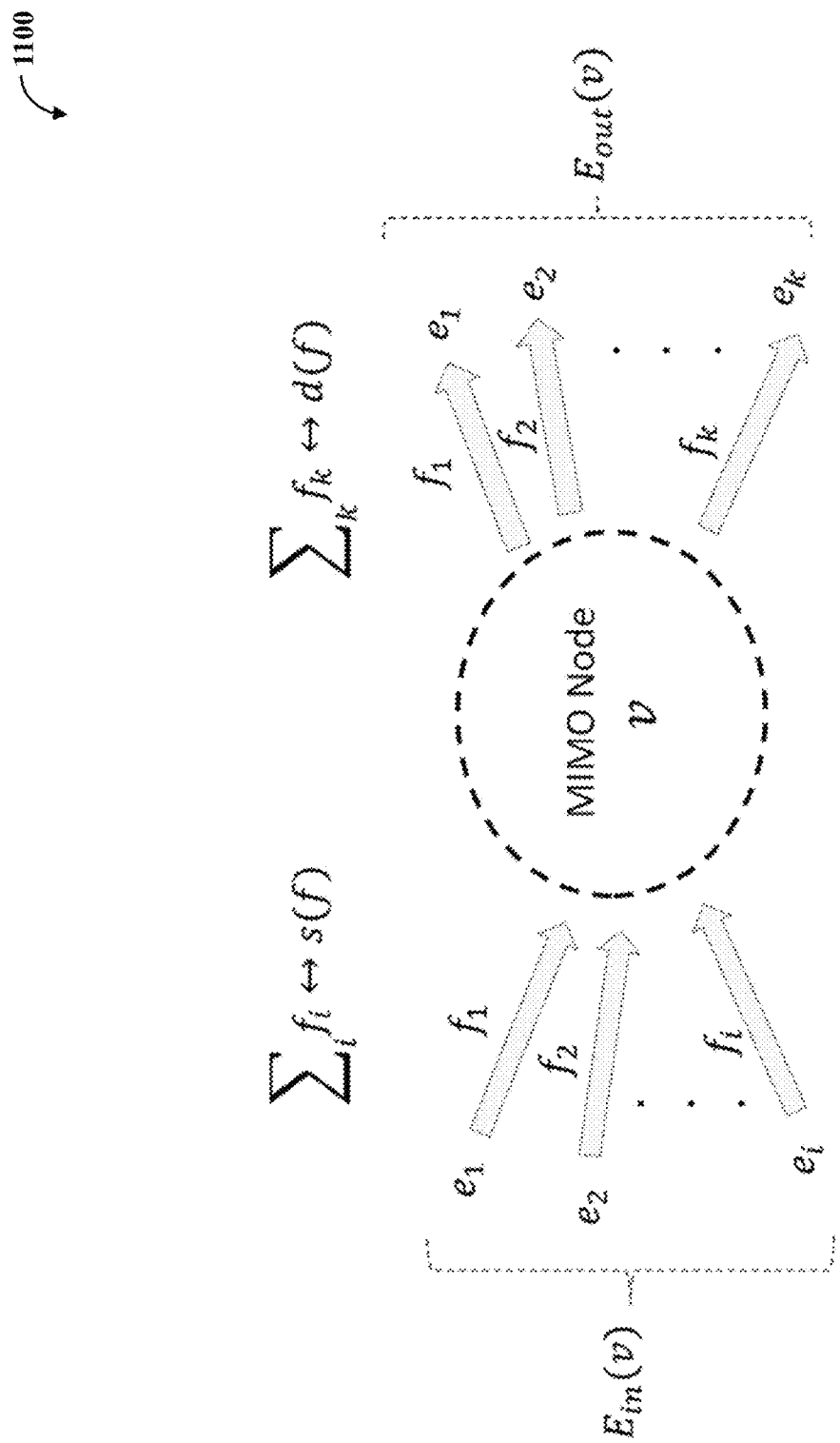
FIG. 11 illustrates one embodiment of a schematic view of MIMO node flow conservation.

FIG. 11 illustrates one embodiment of a schematic view 1100 of MIMO node flow conservation. A MIMO Node can receive traffic from many different links established with neighbors to receive traffic simultaneously (e.g., see FIGS. 5 and 6). In the same token, a MIMO node can establish many links for transferring traffic to multiple nodes simultaneously.

A total amount of traffic that flows into a MIMO node can be transferred out if that node is not a sink node or does not generate new traffic. Accordingly, this can lead to the following:

$$\Sigma_{e \in E_{in}(v)} \Sigma_{i \in MC(e)} x_i^f(e) = \Sigma_{e \in E_{out}(v)} \Sigma_{i \in MC(e)} x_i^f(e); \forall f, \forall v \neq s(f), d(f) \qquad (25)$$

The transmitter degree constraint can be defined as the number the number of simultaneously used antenna combinations and can be configured to not exceed the available number of antennas of the node because an antenna array has limited size. $I_{e,i,\tau}$ is the indicator variable that has value 1 if and only if channel i is active over link e at time slot $\tau$. It should be noted that the channels over outgoing edges of v in E are considered active if there are data transmissions from node v, and the channels over incoming edges of v in the set E and E$^I$ are considered active if there are data transmissions and interference transmissions to v respectively. To satisfy the degree constraint at the transmitter side, the number of antennas used by the active outgoing edges of a node v can be configured to be no larger than its number of antennas $N_v^{ant}$ in each time slot $\tau$:

$$\Sigma_{e \in E_{out}(v)} \Sigma_{i \in MC(e)} m_i(e) I_{e,i,\tau} \leq N_v^{ant}, \forall v \qquad (26)$$

Similarly, corresponding to the receiver's degree constraint, the total number of antennas that are used to decode the receiving transmissions, including data and interference transmissions, (that is, both E and E$^I$ are considered active), can be configured to not exceed the receiving capability of the node. Therefore, this can result in:

$$\Sigma_{e \in E_{in}(v) \cup E_{in}^I} \Sigma_{i \in MC(e)} m_i^r(e) I_{e,i,\tau} \leq N_v^{ant}, \forall v \qquad (27)$$

It can be assumed that routing is performed for each T time slots. Adding these sets of equations for all the T time slots and dividing by T results in the constraints:

$$\Sigma_{e \in E_{out}(v)} \Sigma_{i \in MC(e)} m_i(e) g_i(e) \leq N_v^{ant}, \forall v \qquad (28)$$

$$\Sigma_{e \in E_{in}(v) \cup E_{in}^I} \Sigma_{i \in MC(e)} m_i^r(e) g_i(e) \leq N_v^{ant}, \forall v \qquad (29)$$

where $g_i(e)$ is the fractional link utilization for channel i over link e. Specifically, $$g_i(e) = \sum_f \frac{x_i^f(e)}{c_i(e)} = \frac{1}{T} \sum_{1 \leq \tau \leq T} I_{e,i,\tau}, \quad \forall e, \forall i \qquad (30)$$

The antenna compatibility constraint can be defined as the set of antennas used by different spatial channels and can be configured to not overlap for simultaneous transmissions from multiple spatial channels. Also, as different antenna combinations have different capacities, it can be important to determine which antenna combination to use when a route is determined. Moreover, each node can have a limited number of antennas, and an antenna can be configured to not be used for transmission over different MIMO channels simultaneously. To address this antenna compatibility constraint, the indicator variable $u_{i,a,j,e}$ introduced earlier can be used to represent the constraint as follows:

$$\Sigma_{e \in E_{out}(v)} \Sigma_{i \in MC(e)} u_{i,a,j,e} I_{e,i,\tau} \leq 1, \forall \tau, v, a_j \qquad (31)$$

Like before, adding these sets of equations for all the T time slots and dividing by T results in the constraints assuming routing is done over each T time slots:

$$\Sigma_{e \in E_{out}(v)} \Sigma_{i \in MC(e)} u_{i,a,j,e} g_i(e) \leq 1, \forall v, a_j \qquad (32)$$

For scalability of a large-scale MANET, there can be two-level of hierarchical MIMO MANET routing protocol: physical routing protocol in the access network and logical routing protocol in the backbone network. The backbone network can be formed among the cluster heads of the respective access networks dynamically as mobile nodes move from one place to another. A component can track the additional MIMO related capabilities and constraints in addition to parameters of SISO MANET networking.

An individual data link e can have a capacity $c_i(e)$ on MIMO channel i, and there is an estimated capacity for a given MIMO channel over a link for an estimation period. The set of MCs and the values of $c_i(e)$ can be saved as a look-up table and updated in each estimation period according to the topology/channel condition variations. The length of the period can be determined so that the value $c_i(e)$ can correctly reflect the actual link condition. $x_i^f(e)$ can be used to denote the flow on channel i over data link e that carries the data of the end-to-end flow session f, and define $$g_i(e) = \sum_f \frac{x_i^f(e)}{c_i(e)}$$

as the utilization of MIMO channel i over link e for all flows. In each situation, MIMO-specific (that MU-MIMO) channel, link, and node flow conservation constraints can be used as well as transceiver and antenna degree constraints.

In this way the routing algorithm will be able to establish end-to-end routes that can guarantee the required quality-of-service (QOS) throughput throughout the whole duration of the underlying data sessions. In order to achieve this, the following scheme (e.g., implemented as a method) can be employed:

Differentiate strong from weak interfering streams.

Control the number of strong interfering streams while treat the weak ones as Gaussian noise.

Estimate the expected link throughput without considering any interference.

Include a resource reservation margin to account for the allowing interference.

Use a routing algorithm with a novel utility function to guarantee the end-to-end QOS throughput requirements for the whole duration of each data session.

The basic criteria for interference can be that, if there are number of $n_T$ transmitting antennas/streams, $n_R$ are the receiving antennas, and $n_I$ are interfering steams from neighbors of transmitters, transmitting streams can be decoded successfully when $n_R \geq n_T + n_I$.

An individual wireless transceiver can classify its neighbor nodes into three groups based on the average received signal-to-noise ratio (SNR): Data nodes (e.g., nodes that are within transmission range), strong interfering nodes, and weak interfering nodes. In one example, Let $L_v$ be the set of all nodes able to generate "strong" interference to node v, and Let $D_v$ be the set of all neighboring nodes that are within transmission range of node v.

$D_v \subseteq L_v$.

The scheme can control the number of streams allowed for a given transmission from node v to node w by making sure that:

First, the receiver w has enough available degrees of freedom for "reception" of node v's streams, and Second, the remaining surrounding receivers have enough degrees of freedom to "cancel" out the interfering streams generated by the transmitter v.

From a mathematical standpoint:

Let us denote as $N_{n_T}^v$ and $N_{n_R}^w$, the number of overall antenna elements at the transmitting node v and the receiving node w, respectively.

Moreover, $N_t^v(\tau)$ and $N_r^w(\tau)$, $\tau=1, 2, \ldots, T$ (where T is the number of slots per MAC frame) represents the number of antenna elements used in slot $\tau$ for ongoing transmissions and receptions at nodes v and w, respectively.

Routing can also be performed for each T time slots for now.

$N_{max}$ represents the maximum number of streams that are allowed to simultaneously operate in a given area.

The number of interfering streams that node v can handle in slot $\tau$ can be calculated as:

$$N_I^v(\tau) = N_{max} - N_r^v(\tau) - \Sigma_w N_t^w(\tau), \forall w \in L_v \quad (33)$$

The maximum interference that a neighboring node n of transmitting node v is allowed to generated can be limited by the $$\left[\min_I \{N_I^v(\tau)\}, \forall I \in L_I\right]$$

or its surrounding nodes. Therefore, the "maximum" number of antenna elements that node v can use for transmission can be given by:

$$\{N_t^v(\tau)\}_{max} = \min\left\{[N_{n_T}^v(\tau) - N_t^v(\tau)], \min_I \{N_I^v(\tau)\}\right\}, \forall I \in L_v \quad (34)$$

Similarly, at the receiver side, the maximum number of antenna elements that node m can use for reception can be given by:

$$\{N_r^w(\tau)\}_{max} = \min\left\{[N_{n_R}^w(\tau) - N_r^v(\tau)], \min_I \{N_I^w(\tau)\}\right\} \quad (35)$$

All the interference coming from nodes that do not belong to the set $L_w$ can be treated by node w as Gaussian noise.

The channel between the i-th antenna, $i=1, \ldots, n_T$, of node v and the j-th antenna, $j=1, \ldots, n_R$, of node w can be modeled as follows:

$$h_{j,i}^{(w,v)} = \beta_{j,i}^{(w,v)} \sqrt{\left[\frac{d^{(w,v)}}{d_0}\right]^\delta} \gamma \quad (36)$$

where $\beta_{j,i}^{(w,v)}$ is the Rayleigh fading, $d^{(w,v)}$ is the distance between nodes w & v, $d_0$ is the reference distance, $\delta$ is the path loss coefficient and $\gamma$ is the reference SNR defined as the SNR measured at the reference distance assuming a single transmit antenna transmitting at full power, accounting only for the path loss.

Note the distance between the $n_T$ antennas of node v and the $n_R$ antennas of node w can be assumed to be the same.

The received signal at node w can be written as follows:

$$y_w = H^{(w,v)} x_v + \Sigma_{k=1}^{K_v} H^{(w,k)} x_k + n_j \quad (37)$$

where
[$H^{(w,v)}$]$_{n_R, n_T}$=$h_{j,i}^{(w,v)}$ is the channel matrix
$x_v$ is the transmitted signal vector of node v,
$\Sigma_{k=1}^{K_v} H^{(w,k)} x_k$ is term due $K_v$ number of interfering signals $x_k$ that are interfering with transmitted signal $x_v$ from node v
$n_j$ is the term due to the thermal noise It can be assumed that the channel state information (CSI) is not available at the transmit side, whereas at the receiver, the CSI is perfectly known.

During the link throughput estimation phase, it can be assumed that each transmitter estimates the ergodic open-loop capacity without considering the interference from other links. The open-loop capacity of link $e_{n_T,n_R}$ between two MIMO nodes v and w (without considering the interference term) is given by:

$$C(e_{n_R,n_T}) = \log_2 \det\left(I_{n_T} + \frac{1}{n_R} H^{(w,v)} [H^{(w,v)}]^H\right) \quad (38)$$

where
$[H^{(w,v)}]^H$ is the complex conjugate transposition of $H^{(w,v)}$
The following lower bound for the ergodic open-loop link capacity can be a summation of all individual channel capacity $$E\{C(e_{n_T,n_R})\} = E\left\{\sum_{i=1}^{n_T} c_i(e_{n_T,n_R})\right\} \quad (39)$$

$$E\{C(e_{n_T,n_R})\} \geq \alpha \log_2\left[1 + \frac{\rho}{n_R}\exp\left(\frac{1}{\alpha}\sum_{l=1}^{\alpha}\sum_{p=1}^{\beta-1}\frac{1}{p} - \gamma\right)\right]$$

where
$\alpha = \min(n_R, n_T)$
$\beta = \max(n_R, n_T)$
$\gamma = 0.57721566$ is Euler's constant
Therefore, by using Equations (37) and (38) the estimated link $e_{n_T,n_R}$ throughput can be expressed as:

$$E\{C(e_{n_T,n_R}(\tau))\} \quad (40)$$

In order to account for the weak interfering streams a resource reservation margin, $\xi \geq 1$ can be introduced along with threshold of throughput defined as $S_{TH}$ that is expressed a specific value of a MIMO link e utilization, $$S_{TH} = \frac{\text{Traffic Flow over the MIMO Link}}{\text{Actual Capacity of the MIMO Link}}\bigg|_{TH} = g(e)\bigg|_{TH}.$$

Note that the queuing delay in MIMO node can be dependent on the MIMO link traffic utilization. On the other hand, the physical distance between the between the two nodes provides the indication of the propagation delay while the transmission delay can be calculated knowing the packet size and MIMO link capacity. So, for a given packet size, MIMO link capacity, and geographical distance, if the MIMO link utilization is not allowed to exceed more than the a given threshold say $S_{TH}$, the total delay (queuing, transmission, and propagation) can be constrained for sending a packet from one node to the next-hop neighbor. Using this scheme, we will reserve resources such that for each link $e_{n_R,n_T}$:

$$\Sigma_{\tau=1}^{T} E\{C(e_{n_T,n_R}(\tau))\} = \xi S_{TH} \quad (41)$$

Channel estimation can be based on pilot symbols. Individual nodes can broadcast periodically (every $T_p$) a pilot symbol. Surrounding nodes listen for that pilot symbol for the channel estimation. It can be desirable for pilot symbol transmission to not interfere with other pilot transmissions and moreover, individual receivers should know the identification (ID) of the node that transmits the pilot symbol. This implies that nodes within two-hop area have dedicated and unique slots for their pilot symbol transmissions.

In order to achieve this, a synchronization phase can be introduced to be repeated periodically (e.g., every $T_s$, where $T_s \gg T_s$) that the nodes reserve a unique slot for their pilot symbol transmission. Their neighbors can be aware of the slots and the ID of the transmitting node. In that contention phase, an individual node transmits a request packet with its ID then backs off and waits for nodes replies. The reply can be only negative, that is, only if any of the neighbor nodes is unable to resolve the ID replies with a negative acknowledgment packet (this can be just a busy tone since more than one nodes may send a negative acknowledgment) that implies that a collision took place. If there is no reply from the surrounding nodes, the node assumes that it is the unique transmitter and reserves the pilot slot corresponds to the synchronization slot.

This can be used as discovery phase in ad hoc networks where nodes are listening for the IDs of new nodes. If a node does not receive any ID packet it can assume that it is disconnected. Nevertheless, the node can continue to periodically send its request packet that could be heard by any new node. One-hop neighbors are synchronized to transmit their pilot symbols in different slots. In this case the interference of the adjacent nodes is not included.

Assuming that controlled transmissions take place and that minimum square error estimation with successive interference cancelation (MMSE-SIC) receivers are used, individual MIMO receivers should be able to achieve data rates that are not limited by the interference. A procedure can be practiced such that the actual mutual information for a MIMO link $e_{n_T,n_R}$ with interference known at the receiver side is expressed as:

$$I = \log_2 \det\left(I_{n_T} + \frac{1}{n_R} H^{(w,v)} [H^{(w,v)}]^H R_w^{-1}\right) \quad (42)$$

where $R_j$ represents the whitening matrix as follows:

$$R_j = \Sigma_{k=1}^{N_v} H^{(w,k)} [H^{(w,k)}]^H + I_{n_T} \quad (43)$$

A Quality of Service (QOS) data session can be assumed to be successful if $I \leq S_{TH}$ throughput the route and for the whole duration of the session.

A routing algorithm can be employed that is based on the min-max concept. The algorithm tries to find the route with the maximum throughput bottleneck from source to sink. The bottleneck should satisfy the throughput QOS requirements. Unlike the single antenna case or the full MIMO case where all the antenna elements are used for transmission/reception, the achievable link throughput and bottleneck now depend on the number of streams used for transmission/reception and interference cancellation. The routing algorithm can be summarized in the following actions:

Action A—Route Discovery
  The source s initiates the route discovery by broadcasting a packet to destination node d with the QOS throughput requirements and the available antenna elements $\{N_t^{(s)}(\tau) = N_r^{(d)}(\tau), \tau = 1, 2, \ldots, T\}$ for transmission and the destination node. Note here that a node may not target a specific destination node but any possible gateway.

Throughput Estimation: Nodes w∈D$_s$ perform capacity estimation based on the available transmitting $N_t^{(s)}(\tau)$ and receiving $N_r^{(d)}(\tau)$ streams in each time slot τ and estimate the achievable link throughput as:

$$S_{s,d} = \Sigma_{\tau=1}^T E\{C(N_t^{(s)}(\tau), N_r^{(d)}(\tau))\} \quad (44)$$

If the QOS requirements are satisfied in link e(s, d), node d broadcasts again the packet to all its neighbors k∈D$_d$. The same procedure is repeated until a packet reaches the destination node or expires. Note here that in the QOS requirements the resource reservation margin is included.

Moreover, receivers check if new bottlenecks in the route occur. Generally, if $S_{s,k}$ is the throughput bottleneck of route via node k up to the source node s and link e(s, d) is the next hop in the route, the next-hop receiver d has to update the route via bottleneck node k as:

$$S_{d,k} = \min\{S_{s,k}, S_{s,d}\} \quad (45)$$

In order to avoid loops the packet contains an ID-list of the nodes it has traversed in the route to that point. The receiver can discard the packet if its own ID exists in this list.

Action B—Resource Reservation

Before a node forwards a route discovery packet, the node can perform temporal reservation of streams per time slot for specific path via node k. Let in link e(s, d):

Temporal resource reservation vectors for transmission side can be:

$$S_{s,(k)}(\tau) = \{S_s(1), S_s(2), \ldots, S_s(T)\} \quad (46)$$

Temporal resource reservation vectors for reception side can be:

$$S_{d,(k)}(\tau) = \{S_d(1), S_d(2), \ldots, S_d(T)\} \quad (47)$$

Both nodes s and d can broadcast this information to the nodes that belong to the neighboring L$_s$ and L$_d$ sets, respectively. Note that this reservation can be temporal and can have limited use in the calculations of the following hops of the specific route via node k. Nodes belong to the neighboring L$_s$ and L$_d$ sets can recalculate their available resources based on the Equations (34) and (35) indicting the maximum sets of antenna elements $\{N_t^s(\tau)\}_{max}$, $\{N_r^d(\tau)\}_{max}$ that they can use, respectively.

The final destination node (for example, a gateway), upon reception of a request packet, performs the last link capacity estimation to check if the QOS requirements are satisfied. If they do, it waits until the expiration time of the packet, in case other request packets arrive from the same source through different routes. Then it chooses the one with the greater bottleneck link and replies backwards through this route with the serial number of the route.

Each transmitting node s throughout the chosen route uses the resource $S_{s,(k)}(\tau)$ and $S_{d,(k)}(\tau)$ vectors to temporarily reserve the required resources and broadcasts this information to all the next-hop d∈L$_s$ neighbors.

The method of Actions A and B introduces the cross-layer MIMO QOS constraints in the MIMO-aware routing scheme following the MIMO flow and antenna constraints. This method exploits the multiplexing gain and interference cancelation properties of MIMO antennas. The proposed cross-layer QOS-aware routing algorithms performs end-to-end stream control for individual routes such that more than one MIMO transceivers can operate in the same area at the same time, while each MIMO receiver has enough streams to cancel out the interference generated by any adjacent transmission. This cross-layer MIMO QOS-aware routing algorithm can be implemented in both MANET physical and logical hierarchical routing.

Figure 12:
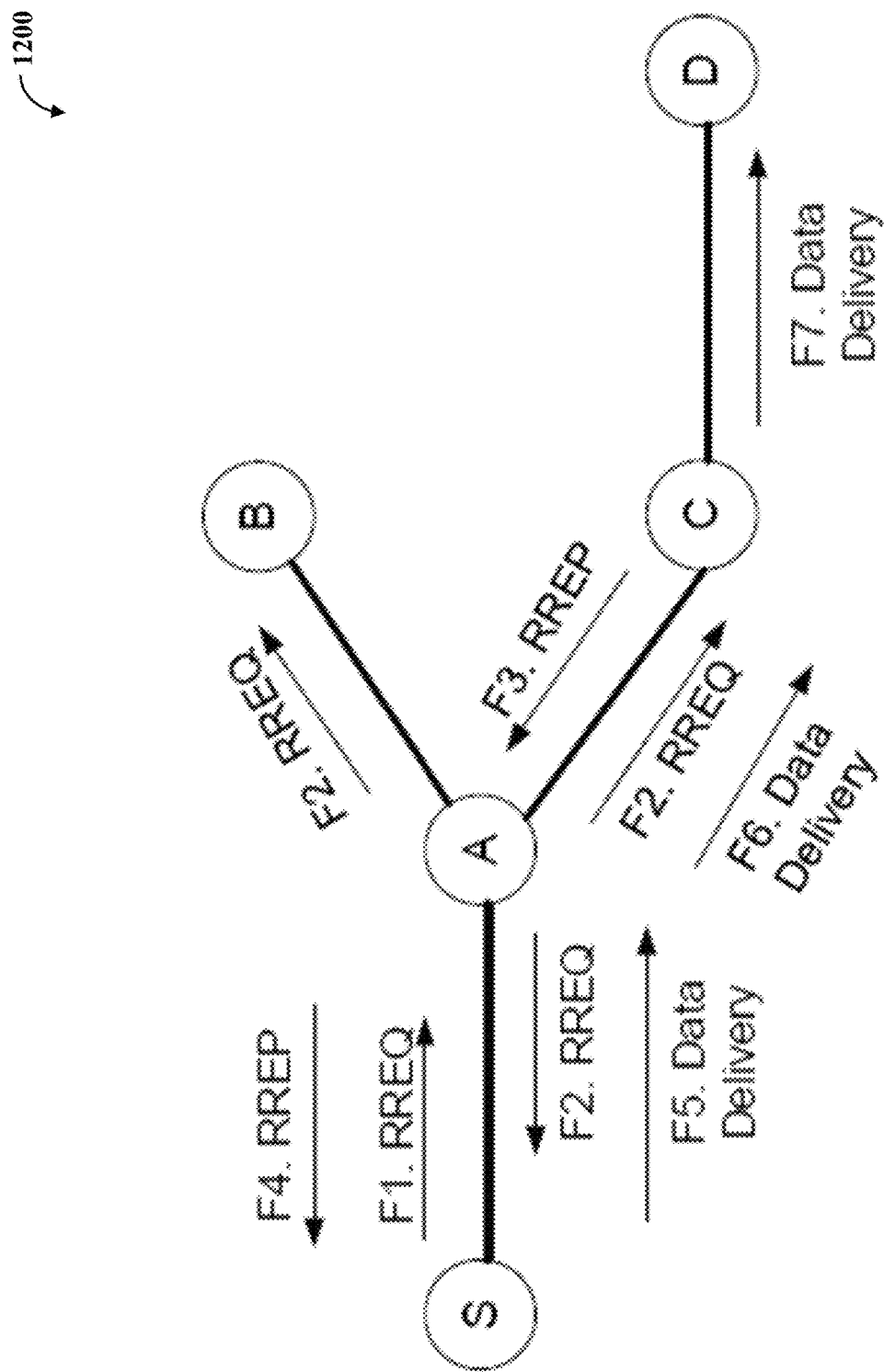
FIG. 12 illustrates one embodiment of a five-node Mobile Ad-Hoc Network (MANET) environment of Secure Ad-Hoc On-Demand Distance Vector (SAODV) routing message and data delivery.
Figure 13:
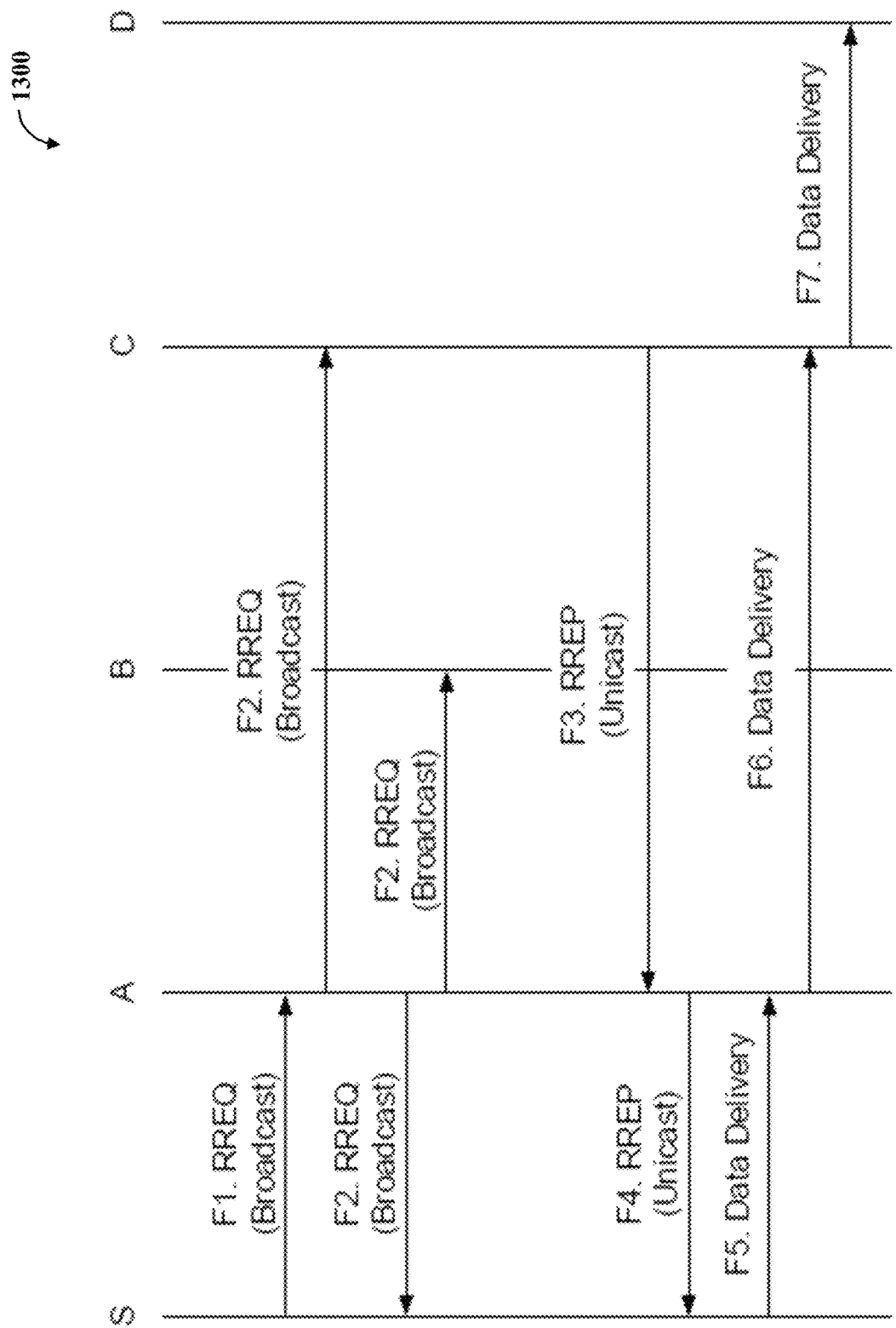
FIG. 13 illustrates one embodiment of a chart detailing a sequence of SAODV routing message flows and data delivery.

FIG. 12 illustrates one embodiment of a five-node MANET environment 1200 and FIG. 13 illustrates one embodiment of a chart 1300 detailing AODV routing message flows and data delivery. The environment 1200 can be employed with regard to Ad-hoc On-Demand Distance Vector (AODV) and secure AODV (SAODV) protocols. AODV is a physical routing protocol for MANETs and offers quick adaptation to dynamic link conditions, low processing and memory overhead, low network utilization, and determines unicast routes to destinations within the ad hoc network as nodes move from one place to another. The AODV can implant with four messages: Route Request (RREQ), Route Reply (RREP), Route Error (RERR), and Route Reply Acknowledgment (RREP-ACK). The AODV can use destination sequence numbers to ensure loop freedom at all times as well as for route freshness criteria. It can use flooding for route discovery and Hello messages for local connectivity in addition to route maintenance. It is an on-demand or reactive routing protocol that reduces traffic overheads. In addition, AODV provides both multicast (e.g. for discovery) and unicast (e.g. route reply) communication.

If the routes are not used and become expired, the routes are discarded reducing states in the route table and thereby the route maintenance cost is reduced. It also implies that the AODV reduces need for route maintenance and minimizes a number of active routes between an active source and destination. Multiple routes can be determined between a source and a destination using the AODV routing protocol, a single route can be implemented because of the following:

It is difficult to manage multiple routes between same source/destination pair;

If one route breaks, it can be difficult to know whether other route is available; and It increases the cost of routing book-keeping maintenance primitively.

AODV discovers routes as and when appropriate (e.g., necessary) and does not maintain routes from every node to every other because it is a reactive routing protocol. Routes can be maintained for a limited time (e.g., just as long as necessary). Thereby, it reduces a routing overhead traffic. In AODV, every node can maintain its monotonically increasing sequence number and increase the sequence number every time the node notices change in the neighborhood topology. AODV can use two routing tables, one for unicast routes and another for multicast routes, to store routing information using the format: Destination Address, Next-Hop Address, Destination Sequence Number, and Route Life-Time. For individual destinations, a node maintains a list of precursor nodes, to route through them. Precursor nodes help to obtain alternates routes in case of link failures. The route life-time can be updated every time the route is used and if a route is not used within its life time, it expires.

The five-node MANET environment 1200, with nodes S, A, B, C, and D, can be used to highlight functioning of AODV route discovery, forward path setup, data delivery, reverse path setup, and route reply. In one example, source node S can want to discover a route to node D. Node S can create a Router-Request (RREQ) message with entering D's IP address, sequence number, S's IP address, sequence number, and hop-count (e.g., initially equal to zero). Node S can then broadcast RREEQ (F1. RREQ) to its neighbors, and in this example it is only node A. Node A receives RREQ and makes a reverse route entry for S:

Destination=S, Next-Hop=S, and Hop-Count=1

Since A has no route to destination D, it rebroadcasts RREQ to its neighbors (F2. RREQ). Nodes B and S will not take any action: B has no neighbors other than A from which the packet comes and S knows that A has forwarded RREQ to its neighbors. Node C receives RREQ and makes a reverse route entry for S:

Destination=S, Next-Hop=A, and Hop-Count=2

However, Node C has a route to destination Node D, and the sequence number for a route to D is D's sequence number in RREQ. Now, node C creates a RREP and enters D's IP address, sequence number, S's IP address, and hop-count to D=1. Node C unicast RREP to node A (F3. RREP). The intermediary node C, not the destination node D, can be the node sending the RREP message.

In AODV, an intermediate node (not the destination) can also send a RREP provided that it knows a more recent path than the one previously known to sender S. However, a new Route Request by node S for a destination is assigned a higher destination sequence number. An intermediate node which knows a route, but with a smaller sequence number, may not be able to send a Route Reply. As an alternative, node C could rebroadcast the RREQ message to its neighboring nodes and, in this case node D could receive RREQ message and then destination node D could send the RREP message creating a little more routing overhead traffic Node A can use received RREP messages from C and makes a forward route entry to D:

Destination=D, Next-Hop=C, Hop-Count=2

Node A can unicast the RREP message to source node S (F4. RREP). In general, a node determines that it has a current route to respond to RREQ (e.g., a path to the destination), it creates the RREP message that contains the IP address of the source and the destination node. If RREP is being sent by destination, the RREP can also contain the following:

Current Sequence Number of Destination, Hop-Count=0, and Life-Time

If RREP is sent by an intermediate node, RREP can contain its record as follows:

Destination Sequence Number, Hop-Count=its distance to destination, its value of the Life-Time When an intermediate node receives the RREP, it can set up a forward path entry to the destination in its route table as follows:

IP Address of Destination, IP Address of node from which the entry arrived, Hop-Count to Destination, and Life-Time The distance to the destination can be measured in hop-count. In this case, a node increments its distance by 1 to obtain its distance to the destination. If the route is not used within the life time, it can be deleted. The node can forward it towards the source after processing the RREP message. Source node S can receive the RREP message and makes a forward entry to D as follows:

Destination=D, Next-Hop=A, and Hop-Count=3

A node in the network can receive multiple RREP for a given destination from more than one neighbor. In this situation, the node can forwards the first RREP it receives and not others. However, it may forward another RREP if that has greater destination sequence number or a smaller hop-count, and the rest is discarded reducing the number of RREP propagating towards the source. Note that the source node can begin data transmission upon receiving the first RREP.

The source node can prepare for the data delivery as soon as it receives the RREP message along the route-path created by the RREP message. In this case, source node S can make a forward route entry to destination node D as follows:

Destination=D, Next-Hop=A, and Hop-Count=3

Then node S can send the data packet on route to node D (F5. Data Delivery). Node A can receive the data packet and can send to node C and node C can send the data packet to destination node D.

Two kinds of timeouts can be being used in AODV for route maintenance—one for Reverse Path and another one for Forward Path. For Reverse Path timeout, a routing table entry maintaining a reverse path can be purged after a timeout interval, but the timeout should be long enough to allow RREP to come back. In case of forward path timeout, a routing table entry maintaining a forward path can be purged if not used for an Active_Route_Timeout interval. However, if no is data being sent using a particular routing table entry, that entry can be deleted from the routing table (even if the route may actually still be valid).

In one embodiment, link failure can be reported. A neighbor of a given node can be considered active for a routing table entry if the neighbor sent a packet within Active_Route_Timeout interval and has forwarded using that entry. If a source node moves, a new route discovery process can be initiated. However, if an intermediate node or a destination node moves away, it means that the next-hop link breaks resulting a link failure. In this case, routing tables are updated for link failures and active neighbors are informed by the RERR message.

Route maintenance can be performed after link breaks with initiation of the RERR message. The RERR message can be initiated by the node upstream (e.g., a node closer to the source) of the break and can be propagated to the affected destinations. RERR lists the nodes that are affected by the link failure. Precursor nodes that were the neighbors of the effected nodes create the list of the effected nodes in RERR and propagate the RERR message. When a node receives an RERR, it marks its route to the destination as invalid setting distance to the destination as infinity in the route table. However, if a source receives an RERR message, it can reinitiate the route discovery.

The RERR message can be initiated by a node when it is unable to forward a given packet via a particular link from the source node to the destination node. However, this node increments the destination sequence number for the destination node cached at this node. It also increments the sequence number included in RERR. When the source node receives the RERR message, it initiates a new route discovery for destination node using destination sequence number at least as large as received in the RERR message. If a destination node receives an RERR message with a certain sequence number, it will set its sequence number to that particular sequence number that has been received in the RERR message, unless it is already a sequence number that is larger than this.

Nodes detect link failures can use Hello messages. Neighboring nodes periodically exchange Hello message among themselves. An absence of a Hello message can be considered as a link failure. In addition, failure to receive several MAC-level acknowledgements can be used as an indication of link failure optimizations as an alternative to Hello message exchanges.

The Time-to-Live (TTL) field can be an important parameter used in AODV routing messages which shows how long a message shall propagate within the network before the message is discarded. For example, with AODV RREQ, if no RREP is received, then larger TTL tried. The advantage of this strategy is that it provides less overhead when successful. However, the disadvantage is that the packet remains for longer time with higher value of TTL if route is not found immediately.

In one embodiment, the security capabilities are not included in AODV routing protocol and AODV messages can be attacked as such because the AODV messages do not have encryption, authentication, and integrity protection. Many kinds of attacks can take place to the AODV like impersonation of a source/destination node by creating fake RREQ/RREP messages with its victim's address as originator and by using a sequence number higher than its victim's. False RERR messages can be created by the attacker spreading fake information in the network, for example, fake RERR messages can falsely announce certain destinations are not reachable any more. More complex attacks can be created fake RERR messages in combination with fake RREQ/RREP messages. Routing loops (e.g. in the network, within a segment of the network, or perhaps denial of service attacks) can be created by attackers using spooled RREQ/RREP messages in order to redirect some traffic through alternative routes. In summary, AODV can be vulnerable to the following types of attacks:

Route Disruption: Attackers disrupt a link through taking is down or a new route from being established.

Route Invasion: Attackers being insiders can insert themselves between two endpoints of a communication channel for routing traffic via them.

Node Isolation: Attackers can prevent a given node from communicating with any other nodes in the network implying the fact that this node is isolated for all possible routes, instead of targeting at two specific endpoints.

Therefore, Secure AOVD (SAODV) can be employed.

The Secure AODV (SAODV) can address the above security vulnerabilities. SAODV is a security extension of the AODV protocol, based on public key cryptography, and does not require additional messages with respect to AODV. SAODV routing messages (RREQs, RREPs, and RERRs) are digitally signed, in order to guarantee their integrity and authenticity. Therefore, a node that generates a routing message signs it with its private key, and the nodes that receive this message verify the signature using the sender's public key. The hop count cannot be signed by the sender, because it must be incremented at every hop. Therefore, in order to protect it (that is, not allow malicious intermediate nodes to decrement it), a mechanism based on hash chains can be used. In its basic form, this makes it impossible for intermediate nodes to reply to RREQs if they have a route towards the destination, because the RREP message must be signed by the destination node. In order to preserve the collaboration mechanism of AODV, SAODV includes a delegation feature that allows intermediate nodes to reply to RREQ messages. This is called the double signature: when a given node, say A, generates a RREQ message, in addition to the regular signature it can include a second signature, which is computed on a fictitious RREP message towards this node A itself. Intermediate nodes can store this second signature in their routing table, along with other routing information related to node A. If one of these nodes then receives a RREQ towards node A, it can reply on behalf of A with a RREP message, similarly to what happens with regular AODV. In order to do so, the intermediate node generates the RREP message, includes node A's signature it previously cached, and signs the message with its own private key.

Nevertheless, SAODV messages are commonly significantly bigger, mostly because of digital signatures. Moreover, SAODV employs heavyweight asymmetric cryptographic operations: when a node generates a routing message it generates a signature, and when a node receives a routing message (also as intermediate node) it verifies the signature. This gets worse when the double signature mechanism is used, since this may require the generation or verification of two signatures for a single message.

A key management can be used that makes it possible for an ad hoc node to obtain public keys from the other nodes of the network. Further, an individual ad hoc node can be capable of securely verifying the association between the identity of a given ad hoc node and the public key of that node. How this is achieved depends on the key management scheme.

Two mechanisms can be used to secure the AODV messages: digital signatures to authenticate the non-mutable fields of the messages and hash chains to secure the hop count information (mutable information in the messages). For the non-mutable information, authentication is perform in an end-to-end manner. The information relative to the hash chains and the signatures is transmitted with the AODV message as an extension message referred to as Signature Extension.

SAODV uses hash chains to authenticate the hop count of RREQ and RREP messages in such a way that allows a node that receives the message (either an intermediate node or the final destination) to verify that the hop count has not been decremented by an attacker. A hash chain can be formed by applying a one-way hash function repeatedly to a seed.

When a node originates a RREQ or a RREP message, it (e.g., a component of the node) can perform the following method:

Generates a random number (seed).

Sets the Max_Hop_Count field to the TimeToLive value (from the IP header).

$$\text{Max\_Hop\_Count} = \text{TimeToLive}$$

Sets the Hash field to the seed value.

$$\text{Hash} = \text{seed}$$

Sets the Hash Function field to the identifier of the hash function that it is going to use. Example values are shown in Table 1.

TABLE 1

Possible Value of the Hash Function

| Value | Hash Function |
|---|---|
| 0 | Reserved |
| 1 | MD5HMAC95 |
| 2 | SHA1MAC96 |
| 3-127 | Reserved |
| 128-255 | Implementation Dependent |

$$\text{Hash\_Function} = h$$

Calculates Top Hash by hashing seed Max Hop Count times.

$$\text{Top\_Hash} = h^{Max\_Hop\_Count}(\text{seed})$$

where:

h is a hash function.

$h^i(x)$ is the result of applying the function h to x for i number of times.

In addition, when a node receives a RREQ or a RREP message, it can perform the following operations in order to verify the hop count:

Applies the hash function $h^{Max\_Hop\_Count-Hop\_Count}$ times to the value in the Hash field, and verifies that the resultant value is equal to the value contained in the Top_Hash field.

$$\text{Top\_Hash} == h^{Max\_Hop\_Count-Hop\_Count} \times (\text{Hash})$$

Where a==b (to verify that a and b are equal).

Before rebroadcasting a RREQ or forwarding a RREP, a node applies the hash function to the Hash value in the Signature Extension to account for the new hop.

$$\text{Hash} = h(\text{Hash})$$

The Hash Function field indicates which hash function is used to compute the hash. Trying to use a different hash function will just create a wrong hash without giving any advantage to a malicious node. Hash Function, Max Hop Count, Top Hash, and Hash fields are transmitted with the AODV message, in the Signature Extension. Nearly all these (e.g., all except the Hash fields) can be signed to protect its integrity.

Digital signatures can be used to protect the integrity of the non-mutable data in RREQ and RREP messages. A problem in applying digital signatures is that AODV allows intermediate nodes to reply RREQ messages if they have a fresh enough route to the destination. While this makes the protocol more efficient it also makes it more complicated to secure. The problem is that a RREP message generated by an intermediate node should be able to sign it on behalf of the final destination. And, in addition, it is possible that the route stored in the intermediate node would be created as a reverse route after receiving a RREQ message (which means that it does not have the signature for the RREP).

To solve this problem, different alternatives can be employed. A first alternative can be that if an intermediate node cannot reply to a RREQ message because it cannot properly sign its RREP message, it just behaves as if it didn't have the route and forwards the RREQ message. A second alternative can be when a node generate a RREQ message, it also includes the RREP flags, the prefix size and the signature that can be used (e.g., by any intermediate node that creates a reverse route to the originator of the RREQ) to reply a RREQ that asks for the node that originated the first RREQ. Moreover, when an intermediate node generates a RREP message, the lifetime of the route has changed from the original one. Therefore, the intermediate node can include both lifetimes (the old one is needed to verify the signature of the route destination) and sign the new lifetime. In this way, the original information of the route is signed by the final destination and the lifetime is signed by the intermediate node.

To distinguish the different SAODV extension messages, the ones that have two signatures are called RREQ and RREP Double Signature Extension. When a node receives a RREQ, it can first verify the signature before creating or updating a reverse route to that host. If the signature is verified, then the route can be stored. If the RREQ is received with a Double Signature Extension, then the node can also store the signature for the RREP and the lifetime (which is the 'reverse route lifetime' value) in the route entry. An intermediate node can reply to a RREQ with a RREP if it fulfills the AODV's requirements to do so and the node has the corresponding signature and old lifetime to put into the Signature and Old Lifetime fields of the RREP Double Signature Extension. Otherwise, it will rebroadcast the RREQ.

When a RREQ is received by the destination itself, it can reply with a RREP if it fulfills the AODV's requirements to do so. This RREP can be sent with a RREP Single Signature Extension. When a node receives a RREP, it can first verify the signature before creating or updating a route to that host. If the signature is verified, the route will be stored with the signature of the RREP and the lifetime.

RERR messages have a big amount of mutable information. In addition, it is not relevant which node started the RERR and which nodes are just forwarding it. The only relevant information is that a neighbor node is informing another node that it is not going to be able to route messages to certain destinations anymore. In one embodiment, nodes (e.g., a node generating or forwarding a RERR message) use digital signatures to sign the whole message and that a neighbor that receives it verifies the signature. In this way it can verify that the sender of the RERR message is really the one that it claims to be. Since destination sequence numbers are not signed by the corresponding node, a node should not update a destination sequence number of its routing table based on a RERR message. Although nodes may not trust destination sequence numbers in a RERR message, they can use them to decide whether they should invalidate a route or not. This does not give any extra advantage to a malicious node.

At times, a node can reboot. The originator of a RREQ can put a much bigger destination sequence number than the real one. In addition, sequence numbers can wraparound when they reach the maximum value allowed by the field size. This allows a very easy attack in where an attacker is able to set the sequence number of a node to any desired value by just sending two RREQ messages to the node. The type of attack is based on the fact that the originator of the RREQ can set the sequence number of the destination. After rebooting, the node does not remember its sequence number anymore, but it waits for a period long enough before being active, so that when it wakes up nobody has stored its old sequence number anymore.

To avoid this attack, in the case that the destination sequence number in the RREQ is bigger than the destination sequence number of the destination node, the destination node can be configured to not take into account the value in the RREQ. Instead, it can realize that the originator of the RREQ is misbehaving and will send the RREP with the right sequence number. In addition, if one of the nodes has a way to store its sequence number every time it modifies it, it might do so. Therefore, when it reboots it will not need to wait long enough so that everybody deletes routes towards it.

An ad hoc node can be configured to have a trustworthy manner of checking the association between the address of some other node and the signature verification key of that node. Bindings between public keys and other attributes can be achieved by using public key certificates. One approach can be for a certification authority (CA) to issue such certificates. This is reasonable if ad hoc nodes could have permanent addresses. However, addressing in ad hoc networks can employ dynamic address allocation and auto-configuration. In these schemes, a node pick can pick a tentative address and check if it is already in use by broadcasting a query. If no conflict is found, the node is allowed to use that address. If a conflict is found, the node is instructed to pick another tentative address and repeat the process. Key management can be included in this along with management of key collision.

Besides how key distribution is achieved, when distributing a public key, the key should be binded to the identity of the node and also to its netmask (e.g., in the case the node is a network leader). An assumption can be made that there are no network leaders in scenarios were it is not needed to have connectivity outside the AODV network. These can prevent the node impersonation type attack in which a malicious node becomes a black hole for a whole subnet.

Figure 14:
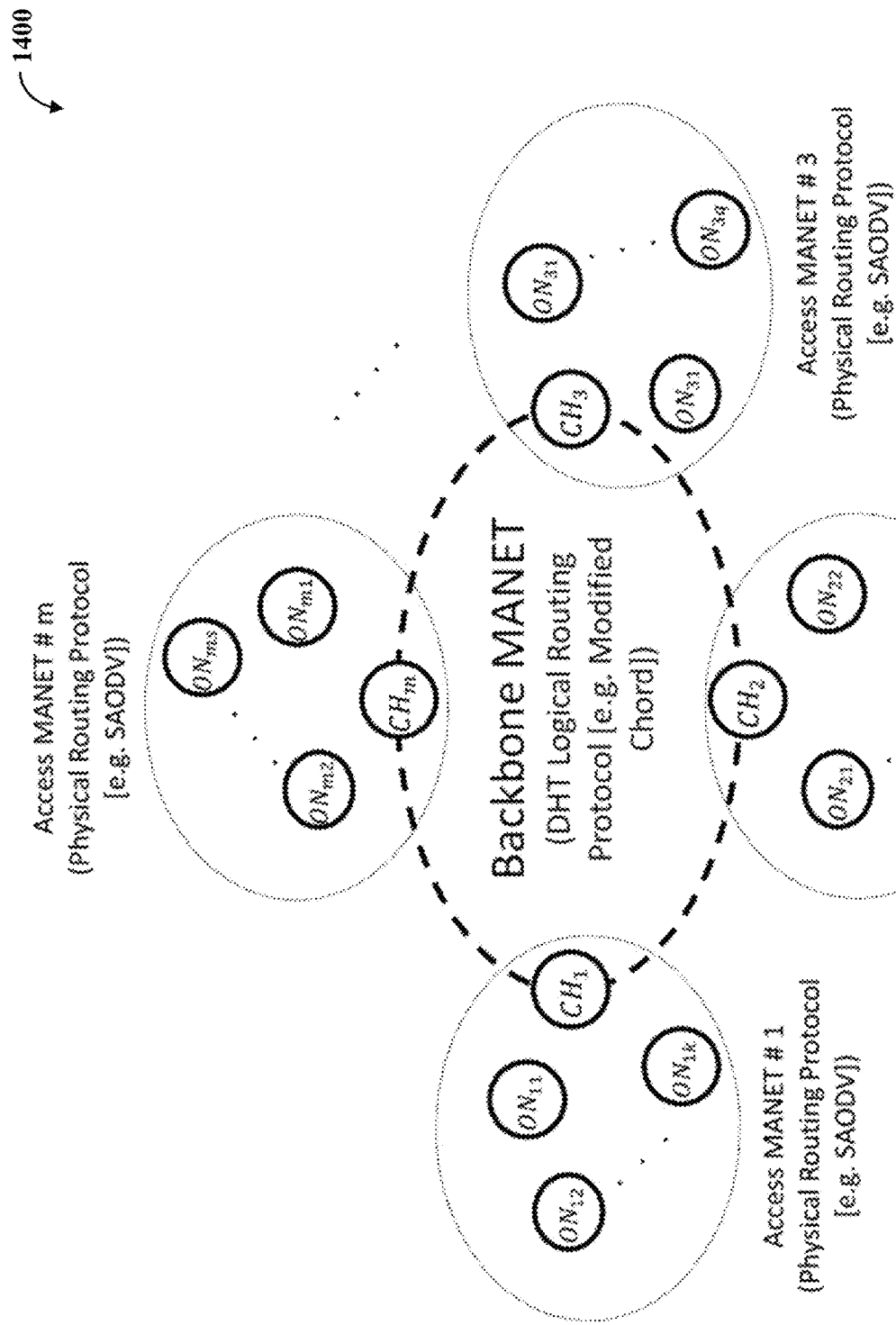
FIG. 14 illustrates one embodiment of a large-scale MIMO MANET with Hierarchical Topology and Routing Protocol.

FIG. 14 illustrates one embodiment of a large-scale MIMO MANET 1400 with Hierarchical Topology and Routing Protocol. In large-scale MANET, hierarchical network topology provides scalability. The hierarchical level can comprise many tiers. However, for simplicity two-level of hierarchical MANET topology are illustrated in FIG. 14: access MANETs and a backbone MANET. A single backbone MANET interconnects the access MANETs. The MANET 1400 can implemented as a cluster-based network where individual access MANET, comprising ordinary nodes (ONs), select a cluster-head (CH) dynamically, and CHs of the respective access networks form a single backbone network. The access MANETs can run the physical routing protocol such as SAODV and secure key-based DHT logical routing protocol can be used in the backbone network among the CHs. That is, in this example, a CH can have physical (e.g. SAODV) and logical routing (e.g. DHT) interfaces for routing.

The cluster-based hierarchical topology can be scalable for large networks because of low overhead traffic that can be generated within the respective community of interests (COIs), that is, the access MANETs, confining routing broadcast traffic only in the respective clusters. It can accommodate heterogeneous capabilities of nodes and can improve (e.g., minimize) the disruption caused by frequent node churn. Individual nodes can function as a MANET and can be considered as an independent peer because each of them is autonomous in moving from one place to another.

The following can be parameters (Hierarchical P2P Overlay, Quality of Cluster (QoC), Overall QoC, Centroid of Cluster, and Hierarchical P2P Overlay) for cluster based design.

Hierarchical P2P Overlay can function under $P=\{p_i, 1 \leq i \leq N_p\} \Rightarrow$ A set of MANET peer nodes P in a P2P MANET network and an overlay network can be a logical network that connects a certain subset of P. $0 < |P^h| < |P^{(h-1)}|$, $\forall h>0$, $\{0 \leq h \leq H\}$, where the overlay network at height h is denoted by $P^{(h)}$ Quality of Cluster (QoC) can be guided by Intra-Cluster Cohesiveness and Inter-Cluster Separation.

$\varphi(c_i)$=Tightness of an individual cluster $c_i$ (we write $c_i$=c for simplicity)

$\varphi(c_i)=\varphi(c)$ $$\varphi(c) = \text{skew}(H_c) = \frac{\sum_k (s_k - \mu_{S_c})^3}{|S_c|\sigma_{S_c}^3}, s_k \in S_c$$

where $$S_c = \left\{ s_k : 1 \leq k \leq \frac{|c|(|c|-1)}{2} \right\}$$

$s_k=\text{sim}(d_i,d_j), d_i,d_j \in c$

|c|=Number of objects in the cluster
sim (•)=A similarity measure between two objects
$S_c$=A set of pair-wise similarity between objects of cluster c
$H_c$=Histogram of similarities in the cluster=$\{h_i: 1 \leq i \leq B\}$
$h_i=\text{count}(s_k)$, $s_k \in S_c$, $\delta \cdot (i-1) \leq s_k < \delta \cdot (i)$
B=Number of histogram bins
$h_i$=Count of similarities in bin i
$\delta$=Bin width of the histogram $$\text{Skew} = \frac{\sum_i (x_i - \mu)^3}{N\sigma^3} \Rightarrow A$$

positive skew indicates a longer tail in the higher interval of the histogram, and vice versa. A negatively-skewed similarity histogram indicates a tight cluster.

Overall QoC can be measured based on skewness of similarity histograms of individual clusters and is derived as a weighted average of the individual clusters skew:

$$\varphi(C) = \frac{\sum_i |c_i| \varphi(c_i)}{\sum_i |c_i|}, c_i \in C$$

The centroid of cluster k, at peer i, is updated according to the following equation which favors tight and dense clusters for iteration t:

$$m_{ik}^t = \frac{\sum_j w_{jk}^{t-1} \cdot m_{jk}^{t-1}}{\sum_j w_{jk}^{t-1}}, j \in Q$$

Some of the MANET ordinary nodes can use the existing physical MANET routing protocol within a given cluster, while the hierarchical MANET cluster-peer nodes can use the proposed MANET key-based logical routing protocol among their peers, known CHs. Once the CHs are formed, a DHT-based logical routing protocol that is described in the next section will be run among themselves.

Figure 15:
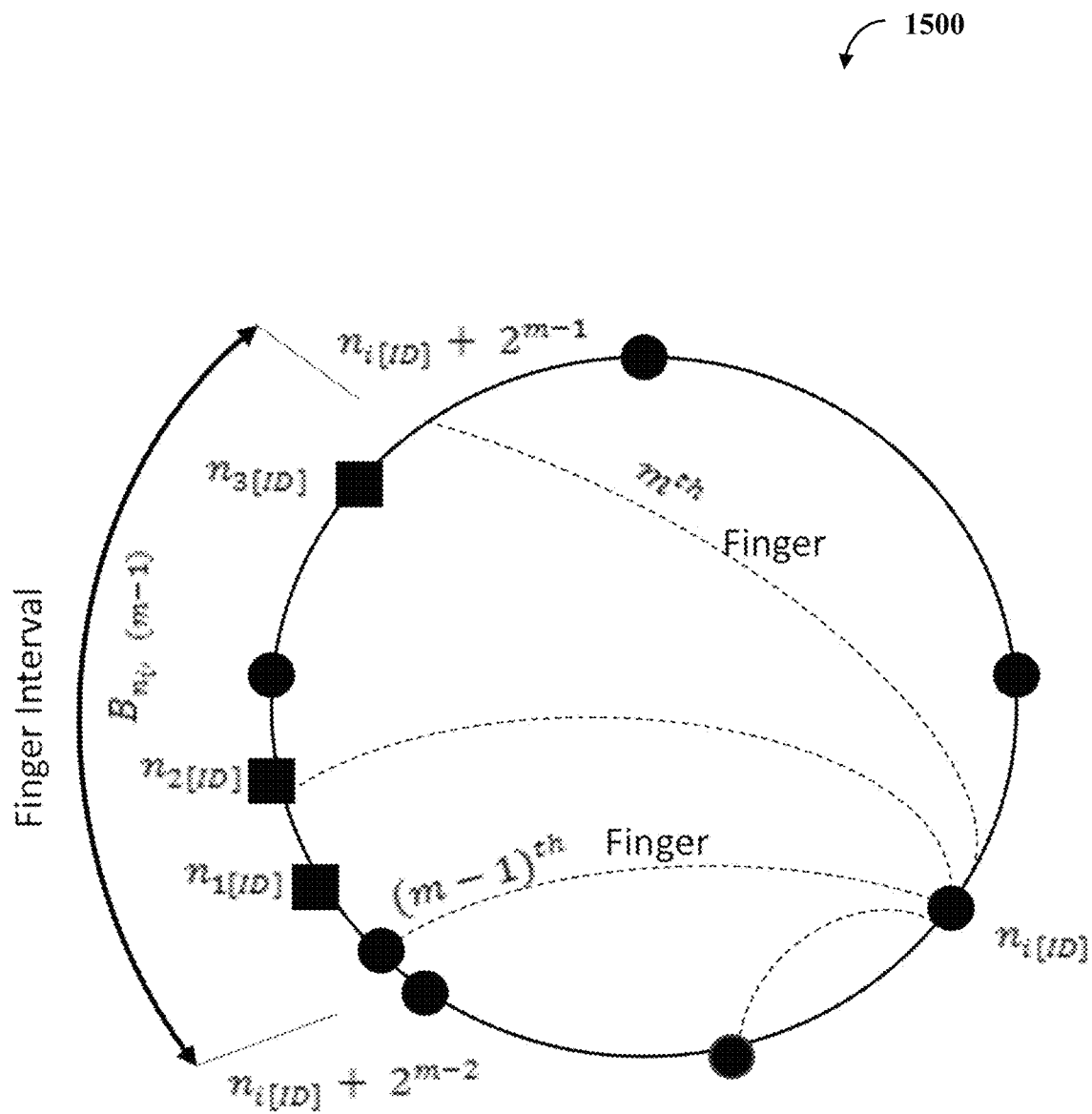
FIG. 15 illustrates one embodiment of a Chord Distributed Hash Table Ring with six nodes.
Figure 16A:
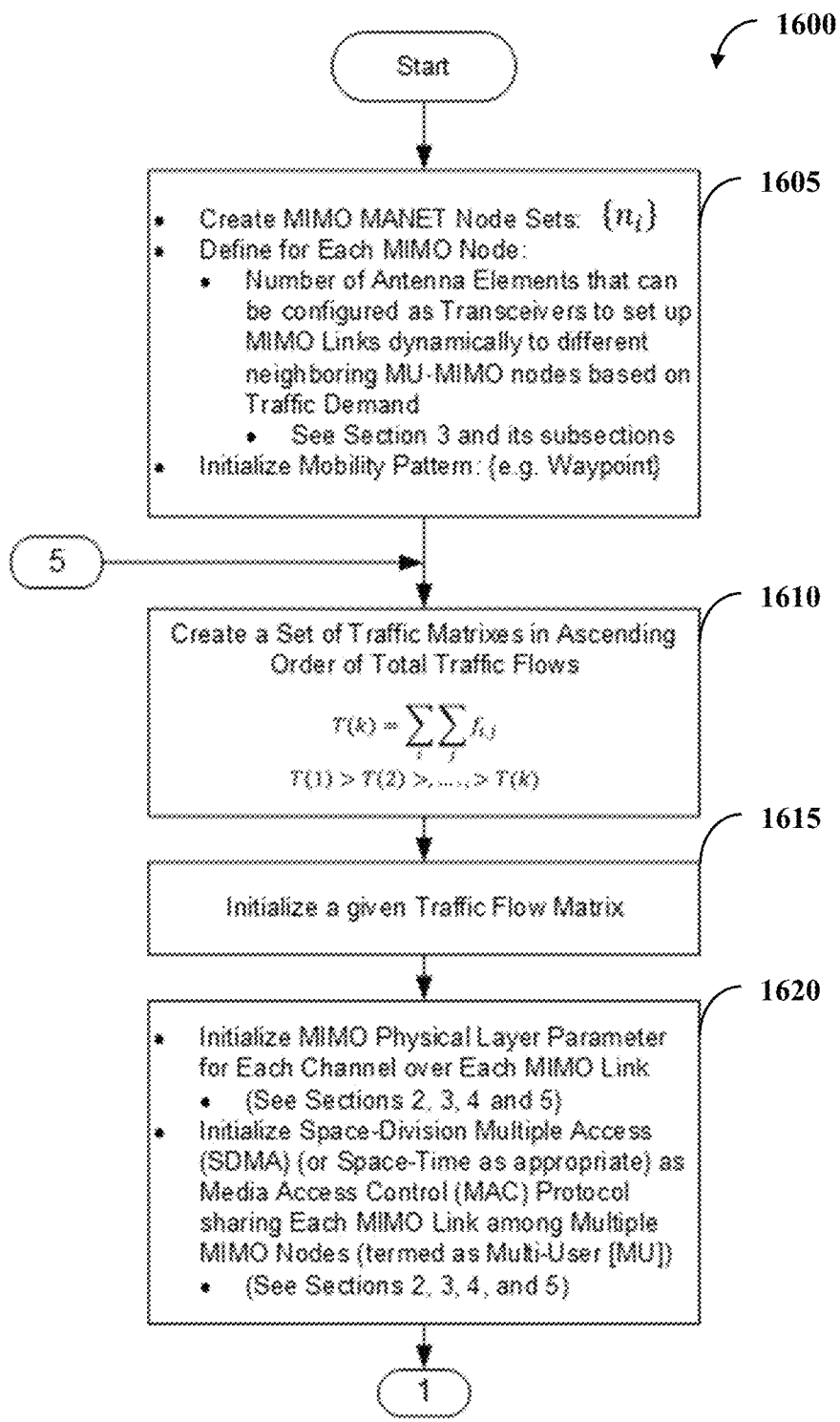
FIGS. 16A-16E illustrates one embodiment of a method for practicing aspects disclosed herein.
Figure 16B:
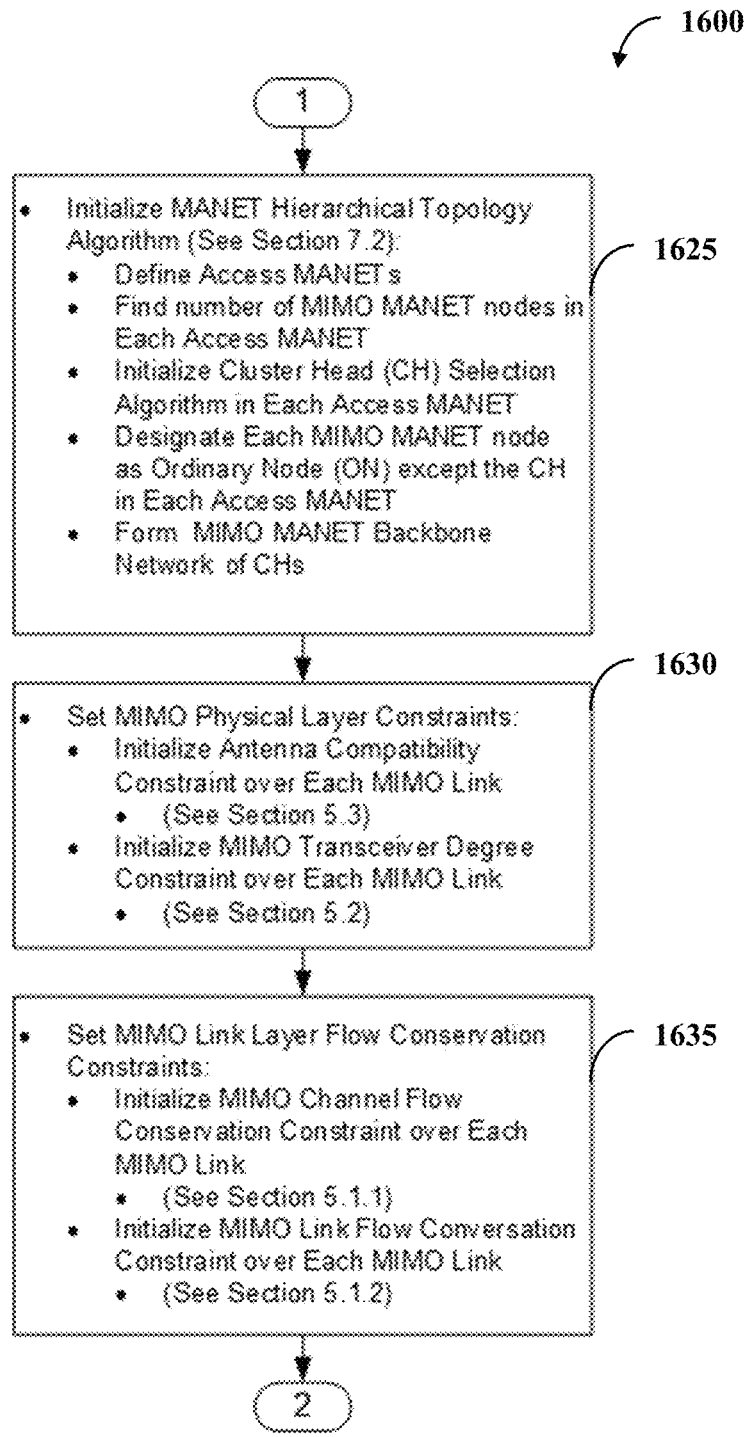
Figure 16C:
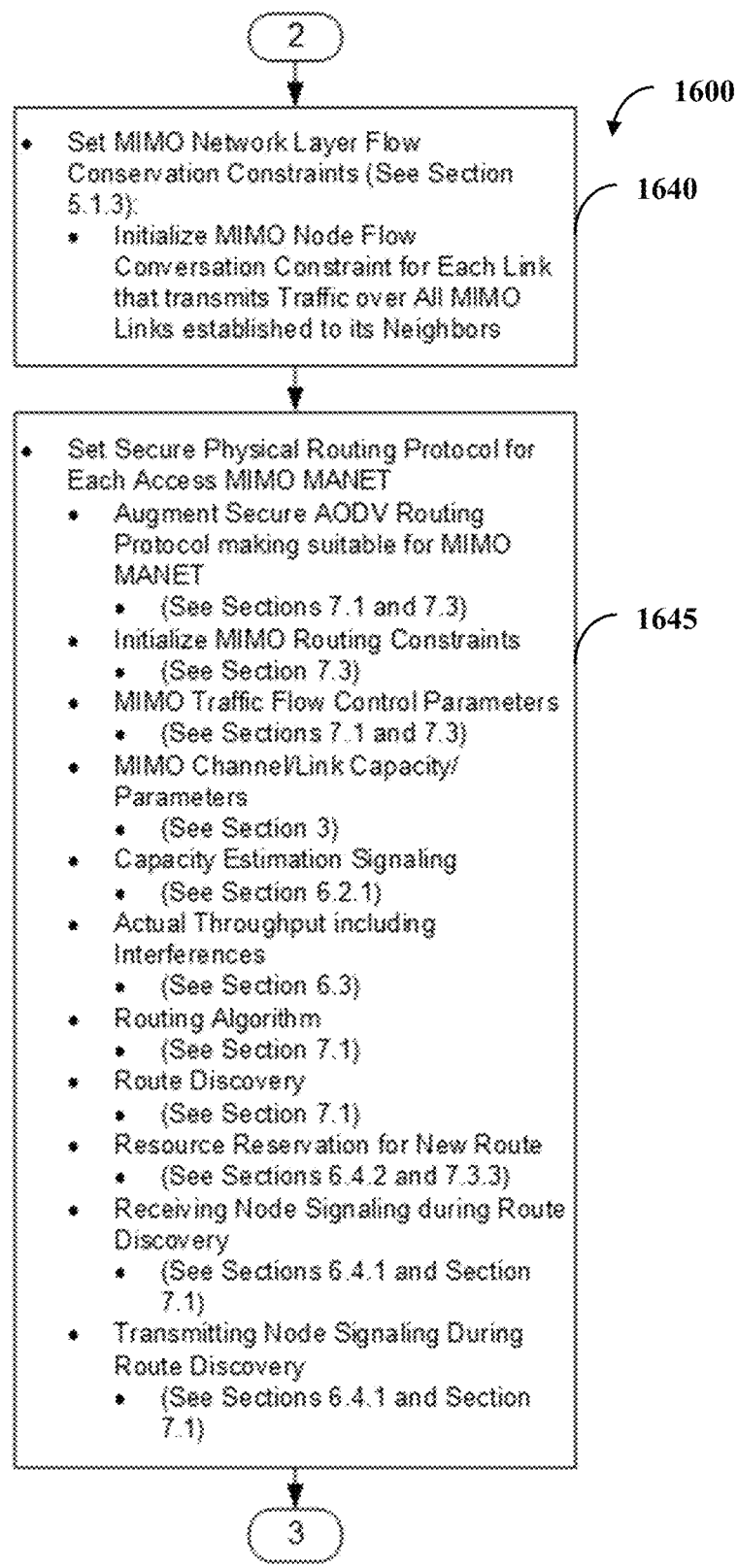
Figure 16D:
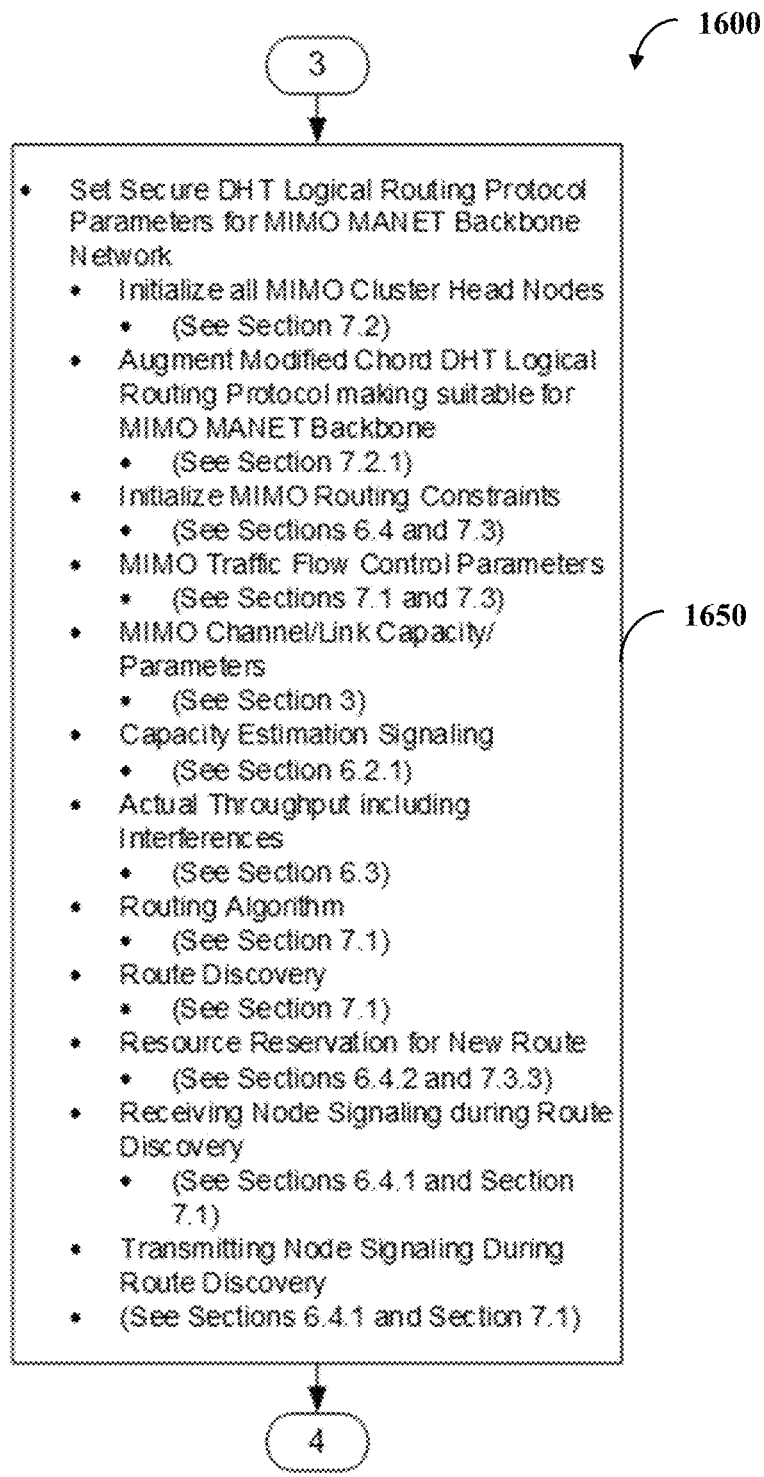
Figure 16E:
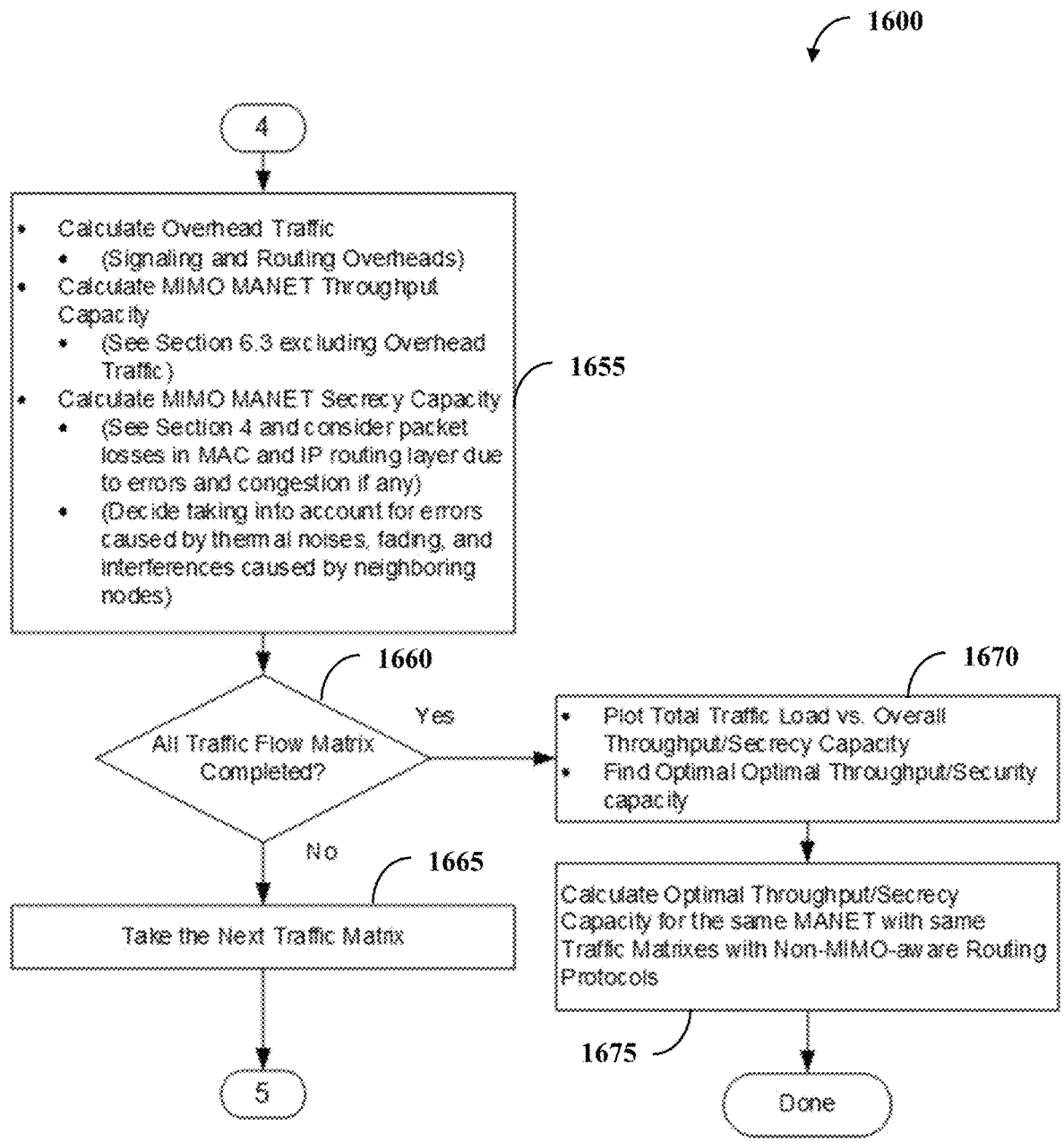

FIG. 15 illustrates one embodiment of a Chord DHT Ring 1500 with six nodes. The ring 1500 can have finger establishment satisfying MIMO MANET performance. A Chord can be an example DTH algorithm. Chord can be a flat DHT that allows for efficient routing without location or other information. A Chord algorithm can be enhanced using MIMO MANET-based performance constraints, termed as resource level, making the algorithm more efficient removing the inefficient blind routing that is not aware of performance.

The Chord-like DHT architecture can be significantly different behavior from non-DHT Chord architecture. This is because the Chord DHT has specific complex requirements of multihop MIMO MANET. Ring 1500 comprises five nodes in $n_i$'s $(m-1)^{st}$ finger interval $B_{n_1,m-1}$, three of which $n_1$ knows in its prospective links list (squares). A finger can be established to $n_2$, the known node with the best resource level (e.g., dependent on resource level such as link/channel utilization/capacity/load and/or other parameters) can be to $n_1$. A flat DHT can use node bandwidth/capacity/resources levels for reliability against failures.

Consistent hashing can be used to distribute keys to nodes. An individual node x can choose a random (or hashed) nodeID ($x_{ID}$) from the binary key space (0, . . . , $2^m-1$), which is viewed as a ring with key values increasing in a clockwise direction. Individual node positions can be at its nodeID on the key ring and establish links to its immediate predecessor and successor as well as a successor list with its r nearest successors, making repairs possible after unexpected node failures. An individual key K can be assigned to the first node whose nodeID is equal to or succeeds K on the key ring. The asymmetric key resource level of the link/channel from a node x (or key) to a node y (or key) via their nodeIDs is the key resource level of the link is the clockwise on the key ring from $x_{ID}$ to $y_{ID}$, and is expressed as follows:

$$l_{key}(x,y)=y_{ID}-x_{ID}, \mod 2^m \qquad (48)$$

Individual nodes $n_i$ in the Chord-like DHT maintain a routing table with up to m entries where m is the number of bits/node as indicated earlier, called the finger table. In the ring 1500, individual nodes $n_i$ (or say x) with NodeID $n_{i[ID]}$ (or $x_{ID}$) choose one link or finger, x·f[i], per finger interval $B_{x,i}:=[x_{ID}+2^{i-1}, x_{ID}+2^i]$ for $i\in\{1, 2, \ldots, m\}$. It should be noted that $n_i$ and x ($n_{i[ID]}$ and $x_{ID}$) are used interchangeably. The corresponding node that x·f[i] points to is noted x·f[i] .nodeID. However, a node can be chosen based link/path bandwidth resource level tailored to meet the specific needs of the backbone MIMO MANET to x in a finger interval. The construct $z_w^{(x,y)}$ can be a link/path bandwidth resource level between nodes x and y via a link/path bandwidth resource level function $w^{(x,y)}: \{0, 1, \ldots, \rho_{max}\} \to \mathbb{R}^+$ with a stretch constant $\alpha > 0$:

$$z_w^{(x,y)} = w(z_B^{(x,y)}) := a \cdot (\rho_{max} - z_B^{(x,y)}), \rho \in \{0,1,2, \ldots, \rho_{max}\} \qquad (49)$$

Note that in the multihop MIMO MANET, the resource level function $w^{(x,y)}: \{0, 1, \ldots, \rho_{max}\} \to \mathbb{R}^+$ is not used other than assuming a certain fixed bandwidth based on the traffic flow. If the link/channel bandwidth is a fixed one rather than a function, it becomes simpler, and the fixed bandwidth can be used. That is, $z_w^{(x,y)} = |S_{TH}|$ as shown in the MIMO MANET analysis above. The resource level between nodes x and y can be provided as follows:

$$l_{resource}(x, y) = l_{link-pathBW}\left(w\left(z_B^{(x,y)}\right)\right) \qquad (50)$$

where
$l_{resource}(x,y)$ is the link/path resources level between nodes x and y and
$l_{link-path\ BW}(w(z_B^{(x,y)}))$ is the link/path bandwidth resource level between nodes x and y. (or more simply phrased as internodes' link/path bandwidth resource level) derived earlier for the multihop MIMO MANET as a function of availability of link/channels bandwidth. In addition to bandwidth, many other performance parameters of MIMO MANET can be included.

An algorithm can be used for creating and/or updating a finger list for DHT routing.

Information about internodes' link/path bandwidth resource levels can be communicated between the nodes. This set of information of can be piggybacked in the primary network messages for efficiency where possible if independent control messages are not created. Individual nodes x can maintain a prospective links list which contains a list of the k best known nodes in terms of resource level for each finger interval $B_{x,i}, i \in \{1, 2, \ldots, m\}$. Thus, at most k nodes in $B_{x,i}$ with the highest resource levels to x are saved via their nodeIDs and resource distances to x. Consider the following algorithm (algorithm 1) in pseudocode for finger list creation and updating of DHT routing:

```
procedure suggestProspectiveLink(nodeInfo)
  finger = getFingerInterval(nodeInfo.key)
  level = getResourceLevel(nodeInfo.interNodeLinkPathResourceLevel)
  if prospectiveLinkList.contains(finger, nodeInfo.key) then
    prospectiveLinkList.updateNode(finger, level, nodeInfo)
  else if level <propectiveLinkList.size(finger) < k then
    prospectiveLinkList.addNode(finger, level, nodeInfo)
  while prospectiveLinkList.size(finger) > k do
    prospectiveLink.List.removeLowestLink(finger)
  end while
  end if
end procedure
```

Note: Link Utilization p is considered

When receiving a message from sender y, node x can use x's resource level to determine $l_{resource}(x,y)$ is and update its prospective links list. An individual node x can maintain a finger table with one finger x·f[i] in an individual $B_{x,i}$ for $i \in \{1, 2, \ldots, m\}$ if prospective links contains at least one entry for $B_{x,i}$, then the entry with the smallest resource distance is contacted with a finger request. Otherwise, the owner (e.g., successor) of key $x_{ID}+2^{i-1}$ can be contacted. In view of this, consider the following algorithm (algorithm 2) in pseudocode for establishing and maintaining fingers:

```
procedure MaintainFinger(finger)
  lookupKey = myKey + getOffset(finger)
  if prospectiveLinkList.size(finger) > 0 then
    listEntry = prospectiveLinkList.getClosestEntry(finger)
    lookupKey = listEntry.key
    prospectiveLink.List.removeUsedEntry(listEntry)
  end if
  sendLookup(lookupKey)
end procedure
```

An entry from the prospective links list can be deleted as soon as it is used for a finger request, ensuring that prospective links are up-to-date and alive. The prospective links list entries can also be continually updated with fresh node information, so the network automatically adapts to changes in node resource levels or coordinates. Note that if there is a finger interval that contains no node, then multiple fingers can point to the same node. On the other hand, if there is at least one node in a finger interval $B_{x,i}$, then x·f[i] can point to a node in $B_{x,i}$. It can be shown in a similar way that the larger i is (e.g., the larger the finger interval), the higher x·f[i]'s resource level can be. This means that high resource level nodes can tend to have more incoming fingers than low resource level node s.

With a flat DHT, the Multi-Level Hierarchical (MLH) DHT lookup routing is performed greedily in a manner such as unidirectional routing like Chord: A node x which looks up a key κ in 0, . . . , 2m−1 forwards the lookup to the closest predecessor of κ in its routing table (e.g., including its successor list and its own nodeID $x_{ID}$ (xID). If x is the closest predecessor, then the key is maintained by x's successor, and the routing is completed after one hop. Since fingers are not deterministically defined in this approach, allowing fingers to be spaced more irregularly, the expected (and worst case) number of hops necessary to locate a key is higher than in Chord. However, this increase can be expressed as a constant factor, leaving the same (O(log N)) complexity as in Chord. In view of this, Chord's Scalable Key Routing can be employed. In view of this, consider the following algorithm (algorithm 3) in pseudocode for scalable key routing:

Notation and Definition finger[i]: First node on circle that succeeds $(n_{i[ID]}+2^{i-1})$ mod $2^m$, $1 \leq i \leq m$ [Note: it is also define earlier]

successor: The next node on the identifier circle; finger[1].nodeID predecessor: The previous node on the identifier circle

---

```
procedure FindSuccessor(id)
  nodeID.FindSuccessor(id)
  if (id ∈ (nodeID, successor])
    return successor;
  else
    nodeID' = closest.ProceedingNoe(id);
    return nodeID'.findSuccessor(id);
end procedure
```

---

Note: The link list created by earlier algorithms is a part of the route discovery in the DHT algorithm.

In one example, m can be the number of bits in the key/node identifiers. An individual node $n_{i[ID]}$ can maintain a routing table with m up to entries (e.g., only O(log n) are distinct), called the DHT finger (or routing) table. The $i^{th}$ entry in the table at node $n_{i[ID]}$ can contain the identity of the first node s that succeeds $n_{i[ID]}$ by at least $2^{i-1}$ on the identifier circle, that is, s=successor(n+$2^{i-1}$) where $1 \leq i \leq m$ (e.g., and all arithmetic is modulo $2^m$). We call node s the $i^{th}$ finger of node $n_{i[ID]}$, and denote it by nodeID·finger[i]. A finger table entry can include the Chord identifier, the IP address (and port number), and other data of the relevant node. Note that the first finger $n_{i[ID]}$ is of the immediate successor of $n_{i[ID]}$ on the circle; for convenience the first finger can be referred to as the successor.

This scheme has at least two notable characteristics. First, an individual node stores information about a small number of other nodes and knows more about nodes closely following it on the identifier circle than about nodes farther away. Second, a node's finger table generally does not contain enough information to directly determine the successor of an arbitrary key k. Algorithm 3 shows the pseudocode of the findSuccessor operation, extended to use finger tables. If id falls between nodeID and its successor, findSuccessor is finished and node nodeID returns its successor. Otherwise, n searches its finger table for the node n' whose ID most immediately precedes id, and then invokes findSuccessor at n'. The reason behind this choice of nodeID' is that the closer n' is to id, the more it will know about the identifier circle in the region of id.

The same cross-layer MIMO-aware QOS algorithm for routing in the context of MANET SAODV physical routing can be used in access networks and logical key-based DHT routing used in the backbone network.

A routing algorithm can be used that is based on the min-max concept. In one example, it tries to find the route with the maximum throughput bottleneck from source to sink. The bottleneck is asked to satisfy the throughput QOS requirements. Unlike the single antenna case or the full MIMO case where all the antenna elements are used for transmission/reception, the achievable link throughput and bottleneck can depend on the number of streams used for transmission/reception and interference cancelation. The routing algorithm portion for route discovery can be implemented by way of the following actions:

The source s initiates the route discovery by broadcasting/unicasting a packet as appropriate by physical (e.g. SAODV)/logical (e.g. DHT) routing protocol to destination node d with the QOS throughput requirements and the available antenna elements $\{N_t^{(s)}(\tau)=N_r^{(d)}(\tau), \tau=1, 2, \ldots, T\}$ for transmission and the destination node. Note here that a node can be configured to not target a specific destination node but instead any possible intermediate node leading to destination.

Throughput Estimation: Nodes $w \in D_s$ perform capacity estimation based on the available transmitting $N_t^{(s)}(\tau)$ and receiving $N_r^{(d)}(\tau)$ streams in each time slot $\tau$ and estimate the achievable link throughput as:

$$S_{s,d} = \sum_{\tau=1}^{T} E\{C(N_t^{(s)}(\tau), N_r^{(d)}(\tau))\}$$

If the QOS requirements are satisfied in link e(s, d), node d broadcasts/unicasts again the packet, as appropriate by physical/logical routing protocol, to its neighbors $k \in D_d$. The same procedure is repeated until a packet reaches the destination node or expires. Note here that in the QOS requirements the resource reservation margin is included. It should be noted that it is possible to convert the throughput as the link/channel utilization ρ.

Receivers check if new bottlenecks in the route occur. Generally, if $S_{s,k}$ is the throughput bottleneck of route via node k up to the source node s and link e(s, d) is the next hop in the route, the next-hop receiver d updates the route via bottleneck node k as:

$$S_{d,k}=\min\{S_{s,k}, S_{s,d}\}$$

In order to avoid loops the packet contains an ID-list of all the nodes it has traversed in the route to that point. The receiver can discard the packet if its own ID exists in this list.

The routing algorithm portion for route reservation can be implemented such that before a node forwards a route discovery packet it performs temporal reservation of streams per time slot for specific path via node k. Let in link e(s, d):

Temporal resource reservation vectors for transmission side can be:

$$S_{s,(k)}(\tau)=\{S_s(1), S_s(2), \ldots, S_s(T)\}$$

Temporal resource reservation vectors for reception side can be:

$$S_{d,(k)}(\tau)=\{S_d(1), S_d(2), \ldots, S_d(T)\}$$

Both nodes s and d can broadcast this information to all the nodes belong to the neighboring $L_s$ and $L_d$ sets, respectively. Note that this reservation can be temporal and can be configured to be only used, in one embodiment, in the calculations of the following hops of the specific route via node k. All the nodes belong to the neighboring $L_s$ and $L_d$ sets can recalculate their available resources based on the Equations (34) and (35) indicting the maximum sets of antenna elements $\{N_t^s(\tau)\}_{max}$, $\{N_r^d(\tau)\}_{max}$ that they can use, respectively.

At a final destination node (for example, a gateway), upon reception of a request packet, a last link capacity estimation can occur to check if the QOS requirements are satisfied. If they are, then the node waits until the expiration time of the packet, in case other request packets arrive from the same source through different routes. Then the node chooses the one with the greater bottleneck link and replies backwards through this route with the serial number of the route.

An individual transmitting node s that is part of the chosen route uses the resource $S_{s,(k)}(\tau)$ and $S_{d,(k)}(\tau)$ vectors to temporarily reserve the required resources and broadcasts this information to the next-hop $d \in L_s$ neighbors.

FIGS. 16A-16E illustrates one embodiment of a method 1600 for practicing aspects disclosed herein. The method 1600 can be performed with consideration of QOS parameters including thermal noises, fading, and neighboring nodes' interferences for this optimization, other networking parameters such as internode distances, impact of different mobility patterns of MANET nodes, life-time of the links as the mobile nodes set up and break links dynamically moving from one place to another with frequently known as churns changing the MANET topology in the infrastructure-less network, availability of the link/network, and others.

At 1605, there can be MIMO MANET node set and defining individual nodes of the MIMO MANET node set. At 1610, there can be creating a set of traffic flow matrixes in ascending order of total traffic flows based, at least in part, on the individual nodes.

At 1615, initializing a first traffic flow matrix from the set of traffic flow matrixes can occur. At 1620 and 1625, further initialization can occur. At 1620, the initialization can comprise initializing MIMO physical layer parameters for individual channels for the first traffic flow matrix and initializing space-based access (e.g., space-division multiple access or space-time multiple access) for individual MIMO links between MIMO nodes for the first traffic flow matrix. At 1625, the initialization can comprise initializing a MANET hierarchical topology algorithm. This can comprise defining access MANETs, finding a number of MIMO MANET nodes in individual access MANETs, initiating Cluster Head (CH) selection algorithm for individual access MANETs, designating individual nodes as ordinary that are not selected as CH; and forming MIMO MANET backbone from CHs.

At 1630-1640, setting MIMO constraints for the first traffic flow matrix can occur. This can comprise setting MIMO physical layer constraints at 1630, setting MIMO link layer flow conservation constraints at 1635, and setting MIMO network layer flow conservation constraints at 1640. Setting the MIMO physical layer constraints can comprise initializing antenna compatibility constraint over individual MIMO links and initializing MIMO transceiver degree constraint over individual MIMO links. Setting MIMO link layer flow conservation constraints can comprise initializing MIMO channel flow conservation constraint over individual MIMO links and initializing MIMO link flow conversion constraint over individual MIMO links. Setting MIMO network layer flow conservation constraints can comprise initializing MIMO node flow conversion constrains for individual MIMO links that transmit traffic over links with a node's neighbors.

At 1645 and 1650, there can be setting MIMO protocols for the first traffic flow matrix. At 1645, there can be setting secure physical routing protocol. This can comprise augmenting secure ad-hoc on-demand distance vector routing protocol to be suitable for MANET MIMO, initializing MIMO routing constraints, instituting MIMO traffic flow control parameters, instituting MIMO capacity parameters, estimating capacity signaling, calculating throughput including interferences, implementing a routing algorithm, discovering routes, reserving resources for a new route, receiving node signaling, and transmitting node signaling. At 1650, there can be setting secure distributed hash table (DHT) logical routing protocol parameters. This can comprise initializing MIMO cluster head nodes, augmenting modified chord DHT logical routing protocol to make suitable for MIMO MANET backbone, initializing MIMO routing constraints, instituting MIMO traffic flow control parameters, instituting MIMO capacity parameters, estimating capacity signaling, calculating throughput including interferences, implementing a routing algorithm, discovering routes, reserving resources for a new route, receiving node signaling, and transmitting node signaling.

At 1655, performing a MIMO calculation set in view of the MIMO constraints and MIMO protocols for the first traffic flow matrix can occur. This can comprise calculating overhead traffic, calculating MIMO MANET throughput capacity, and calculating MIMO MANET secrecy capacity.

At 1660, determining if a subsequent traffic flow matrix exists for the MIMO MANET. If such a subsequent traffic flow matrix exists, a next matrix can be selected at 1665 and the method can return to 1610. After the flow matrices are processed, at 1670 there can be plotting total traffic load against overall capacity to produce a plot result and finding preferred capacity based, at least in part, on the plot result. At 1675, there can be performing routing based, at least in part, on a result of the MIMO calculation set, such as by calculating throughput. Such that routing is performed based, at least in part, on a result of the MIMO calculation set.

The method 1600 can illustrate how to improve (e.g., optimize) the multihop MIMO MANET network throughput and secrecy capacity. The MANET network can function with a set of frequency-nonselective, slow/Rayleigh fading, and uncoded channels along with interference combining both physical, link, and higher layer encryption techniques for the payload in addition to signaling. MIMO-aware cross-layer secure MANET physical and key-based logical hierarchical routing can be employed proving scalability. The MIMO-aware MANET IP Routing can be implemented with two kinds of routing: Physical Routing such as SAODV in the access MANET and Secure Key-based DHT "logical" routing in the backbone MANET. This allows for both security and performance metrics and to improve (e.g., optimize) both network throughput/bandwidth and secrecy capacity. Other parameters that can be considered include internode distances, impact of different mobility patterns of MANET nodes, life-time of the links as the mobile nodes set up and break links dynamically moving from one place to another with frequently known as churns changing the MANET topology in the infrastructure-less network, availability of the link/network, and others.

Figure 17:
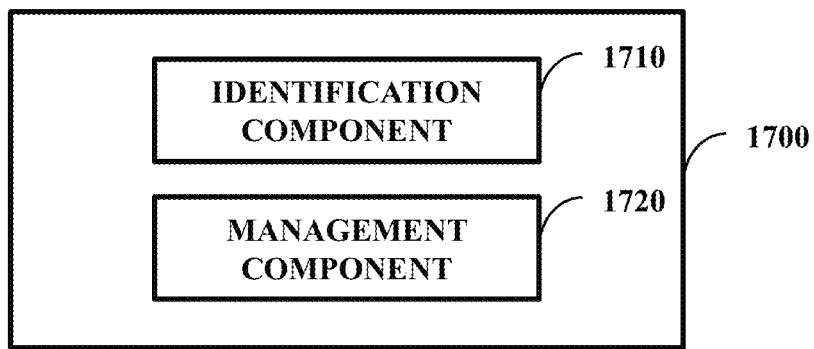
FIG. 17 illustrates one embodiment of a system comprising an identification component and a management component.

FIG. 17 illustrates one embodiment of a system 1700 comprising an identification component 1705 and a management component 1710. The identification component 1705 can be configured to identify a change in a MIMO MANET, such as loss of an element or addition of an element. The management component 1710 can be configured to manage routing in the MIMO MANET in response to the change.

Figure 18:
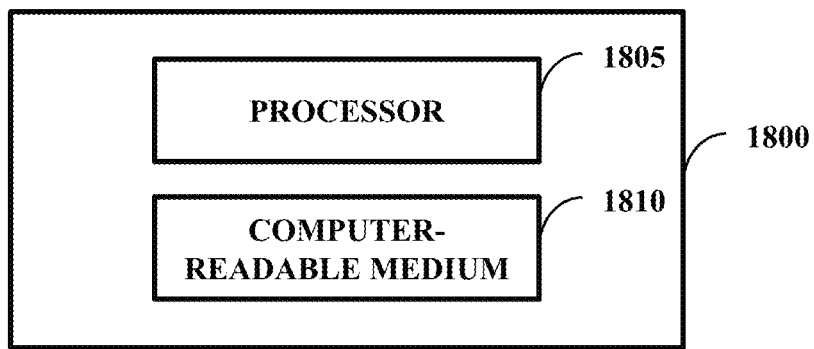
FIG. 18 illustrates one embodiment of a system comprising a processor and a computer-readable medium.

FIG. 18 illustrates one embodiment of a system 1800 comprising a processor 1805 and a computer-readable medium 1810 (e.g., non-transitory computer-readable medium). In one embodiment, the computer-readable medium 1810 is communicatively coupled to the processor 1805 and stores a command set executable by the processor 1805 to facilitate operation of at least one component disclosed herein (e.g., the identification component 1705 of FIG. 17). In one embodiment, at least one component disclosed herein (e.g., the management component 1710 of FIG. 17) can be implemented, at least in part, by way of non-software, such as implemented as hardware by way of the system 1800. In one embodiment, the computer-readable medium 1810 is configured to store processor-executable instructions that when executed by the processor 1805 cause the processor 1805 to perform at least part of a method disclosed herein (e.g., the methods 1600 of FIGS. 16A-16E).

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A system, that is at least partially hardware, comprising:
an identification component configured to identify a change in a multiple-input, multiple-output (MIMO) multihop mobile ad hoc network (MANET); and
a management component configured to manage routing in the MIMO MANET in response to the change,
where the change is a loss of an element of the MIMO MANET,
where to manage routing the management component creates a MIMO MANET node set,
where to manage routing the management component defines individual nodes of the MIMO MANET node set,
where to manage routing the management component creates a set of traffic flow matrixes in ascending order of total traffic flows based, at least in part, on the individual nodes,
where to manage routing the management component initializes a first traffic flow matrix from the set of traffic flow matrixes,
where to manage routing the management component sets MIMO constraints for the first traffic flow matrix,
where to manage routing the management component sets MIMO protocols for the first traffic flow matrix,
where to manage routing the management component performs a MIMO calculation set in view of the MIMO constraints and MIMO protocols for the first traffic flow matrix,
where to manage routing the management component performs routing based, at least in part, on a result of the MIMO calculation set,
where the management component sets the MIMO constraints by setting MIMO physical layer constraints,
where the management component sets the MIMO constraints by setting MIMO link layer flow conservation constraints, and
where the management component sets the MIMO constraints by setting MIMO network layer flow conservation constraints.

2. The system of claim 1,
where the management component sets the MIMO physical layer constraints by initializing antenna compatibility constraint over individual MIMO links, and
where the management component sets the MIMO physical layer constraints by initializing MIMO transceiver degree constraint over individual MIMO links.

3. The system of claim 1,
where the management component sets the MIMO link layer flow conservation constraints by initializing MIMO channel flow conservation constraint over individual MIMO links and
where the management component sets the MIMO link layer flow conservation constraints by initializing MIMO link flow conversion constraint over individual MIMO links.

4. The system of claim 1,
where the management component sets the MIMO network layer flow conservation constraints by initializing MIMO node flow conversion constrains for individual MIMO links that transmit traffic over links with a node's neighbors.

5. A system, that is at least partially hardware, comprising:
an identification component configured to identify a change in a multiple-input, multiple-output (MIMO) multihop mobile ad hoc network (MANET); and
a management component configured to manage routing in the MIMO MANET in response to the change,
where the change is a loss of an element of the MIMO MANET,
where to manage routing the management component creates a MIMO MANET node set;
where to manage routing the management component defines individual nodes of the MIMO MANET node set;
where to manage routing the management component creates a set of traffic flow matrixes in ascending order of total traffic flows based, at least in part, on the individual nodes;
where to manage routing the management component initializes a first traffic flow matrix from the set of traffic flow matrixes;
where to manage routing the management component sets MIMO constraints for the first traffic flow matrix;
where to manage routing the management component sets MIMO protocols for the first traffic flow matrix by setting secure physical routing protocol and by setting secure distributed hash table (DHT) logical routing protocol parameters;
where to manage routing the management component performs a MIMO calculation set in view of the MIMO constraints and MIMO protocols for the first traffic flow matrix; and
where to manage routing the management component performs routing based, at least in part, on a result of the MIMO calculation set.

6. A system, that is at least partially hardware, comprising:
an identification component configured to identify a change in a multiple-input, multiple-output (MIMO) multihop mobile ad hoc network (MANET); and
a management component configured to manage routing in the MIMO MANET in response to the change,
where the change is a loss of an element of the MIMO MANET,
where to manage routing the management component creates a MIMO MANET node set,
where to manage routing the management component defines individual nodes of the MIMO MANET node set,
where to manage routing the management component creates a set of traffic flow matrixes in ascending order of total traffic flows based, at least in part, on the individual nodes,
where to manage routing the management component initializes a first traffic flow matrix from the set of traffic flow matrixes,
where to manage routing the management component sets MIMO constraints for the first traffic flow matrix,
where to manage routing the management component sets MIMO protocols for the first traffic flow matrix,
where to manage routing the management component performs a MIMO calculation set in view of the MIMO constraints and MIMO protocols for the first traffic flow matrix, where to manage routing the management component performs routing based, at least in part, on a result of the MIMO calculation set, where to manage routing the management component initializes MIMO physical layer parameters for individual channels for the first traffic flow matrix, where to manage routing the management component initializes space-based access for individual MIMO links between MIMO nodes for the first traffic flow matrix, and where to manage routing the management component initializes a MANET hierarchical topology algorithm.

7. The system of claim 6, where the space-based access is space-division multiple access.

8. The system of claim 6, where the space-based access is space-time multiple access.

9. The system of claim 6, where the management component initializes the MANET hierarchical topology algorithm by:
    defining access MANETs;
    finding a number of MIMO MANET nodes in individual access MANETs;
    initiating Cluster Head (CH) selection algorithm for individual access MANETs;
    designating individual nodes as ordinary that are not selected as CH; and
    forming MIMO MANET backbone from CHs.

10. The system of claim 6, where the space-based access is space-division multiple access and where the management component initializes the MANET hierarchical topology algorithm by:
    defining access MANETs;
    finding a number of MIMO MANET nodes in individual access MANETs;
    initiating Cluster Head (CH) selection algorithm for individual access MANETs;
    designating individual nodes as ordinary that are not selected as CH; and
    forming MIMO MANET backbone from CHs.

11. The system of claim 6, where the space-based access is space-time multiple access and where the management component initializes the MANET hierarchical topology algorithm by:
    defining access MANETs;
    finding a number of MIMO MANET nodes in individual access MANETs;
    initiating Cluster Head (CH) selection algorithm for individual access MANETs;
    designating individual nodes as ordinary that are not selected as CH; and
    forming MIMO MANET backbone from CHs.

12. A system, that is at least partially hardware, comprising:
    an identification component configured to identify a change in a multiple-input, multiple-output (MIMO) multihop mobile ad hoc network (MANET); and
    a management component configured to manage routing in the MIMO MANET in response to the change,
    where the change is an addition of an element to the MIMO MANET,
    where to manage routing the management component creates a MIMO MANET node set,
    where to manage routing the management component defines individual nodes of the MIMO MANET node set,
    where to manage routing the management component creates a set of traffic flow matrixes in ascending order of total traffic flows based, at least in part, on the individual nodes,
    where to manage routing the management component initializes a first traffic flow matrix from the set of traffic flow matrixes,
    where to manage routing the management component sets MIMO constraints for the first traffic flow matrix,
    where to manage routing the management component sets MIMO protocols for the first traffic flow matrix,
    where to manage routing the management component performs a MIMO calculation set in view of the MIMO constraints and MIMO protocols for the first traffic flow matrix,
    where to manage routing the management component performs routing based, at least in part, on a result of the MIMO calculation set,
    where the management component sets the MIMO constraints by setting MIMO physical layer constraints,
    where the management component sets the MIMO constraints by setting MIMO link layer flow conservation constraints, and
    where the management component sets the MIMO constraints by setting MIMO network layer flow conservation constraints.

13. The system of claim 12,
    where the management component sets the MIMO physical layer constraints by initializing antenna compatibility constraint over individual MIMO links, and
    where the management component sets the MIMO physical layer constraints by initializing MIMO transceiver degree constraint over individual MIMO links.

14. The system of claim 12,
    where the management component sets the MIMO link layer flow conservation constraints by initializing MIMO channel flow conservation constraint over individual MIMO links and
    where the management component sets the MIMO link layer flow conservation constraints by initializing MIMO link flow conversion constraint over individual MIMO links.

15. The system of claim 12,
    where the management component sets the MIMO network layer flow conservation constraints by initializing MIMO node flow conversion constrains for individual MIMO links that transmit traffic over links with a node's neighbors.

16. A system, that is at least partially hardware, comprising:
    an identification component configured to identify a change in a multiple-input, multiple-output (MIMO) multihop mobile ad hoc network (MANET); and
    a management component configured to manage routing in the MIMO MANET in response to the change,
    where the change is an addition of an element to the MIMO MANET,
    where to manage routing the management component creates a MIMO MANET node set;
    where to manage routing the management component defines individual nodes of the MIMO MANET node set;
    where to manage routing the management component creates a set of traffic flow matrixes in ascending order of total traffic flows based, at least in part, on the individual nodes;

where to manage routing the management component initializes a first traffic flow matrix from the set of traffic flow matrixes;

where to manage routing the management component sets MIMO constraints for the first traffic flow matrix;

where to manage routing the management component sets MIMO protocols for the first traffic flow matrix by setting secure physical routing protocol and by setting secure distributed hash table (DHT) logical routing protocol parameters;

where to manage routing the management component performs a MIMO calculation set in view of the MIMO constraints and MIMO protocols for the first traffic flow matrix; and where to manage routing the management component performs routing based, at least in part, on a result of the MIMO calculation set.

17. The A system, that is at least partially hardware of claim 16, comprising:
an identification component configured to identify a change in a multiple-input, multiple-output (MIMO) multihop mobile ad hoc network (MANET); and a management component configured to manage routing in the MIMO MANET in response to the change, where the change is an addition of an element to the MIMO MANET, where to manage routing the management component creates a MIMO MANET node set, where to manage routing the management component defines individual nodes of the MIMO MANET node set, where to manage routing the management component creates a set of traffic flow matrixes in ascending order of total traffic flows based, at least in part, on the individual nodes, where to manage routing the management component initializes a first traffic flow matrix from the set of traffic flow matrixes, where to manage routing the management component sets MIMO constraints for the first traffic flow matrix, where to manage routing the management component sets MIMO protocols for the first traffic flow matrix, where to manage routing the management component performs a MIMO calculation set in view of the MIMO constraints and MIMO protocols for the first traffic flow matrix, where to manage routing the management component performs routing based, at least in part, on a result of the MIMO calculation set, where to manage routing the management component initializes MIMO physical layer parameters for individual channels for the first traffic flow matrix, where to manage routing the management component initializes space-based access for individual MIMO links between MIMO nodes for the first traffic flow matrix, and where to manage routing the management component initializes a MANET hierarchical topology algorithm.

* * * * *